United States Patent
Shi et al.

(10) Patent No.: US 10,257,813 B2
(45) Date of Patent: Apr. 9, 2019

(54) APPARATUS AND METHOD FOR DEFERRING CELL UPDATE MESSAGES FROM USER EQUIPMENT

(71) Applicant: QUALCOMM Incorporated, San Diego, CA (US)

(72) Inventors: Yongsheng Shi, San Diego, CA (US); Adarsh Kumar Jinnu, Hyderabad (IN); Guruvayurappan Vasudevan, Hyderabad (IN); Sathish Krishnamoorthy, Hyderabad (IN); Liangchi Hsu, San Diego, CA (US); Sitaramanjaneyulu Kanamarlapudi, San Diego, CA (US); Mallikarjuna Rao Gorumuchu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 217 days.

(21) Appl. No.: 13/971,017

(22) Filed: Aug. 20, 2013

(65) Prior Publication Data

US 2014/0098755 A1    Apr. 10, 2014

Related U.S. Application Data

(60) Provisional application No. 61/710,514, filed on Oct. 5, 2012.

(51) Int. Cl.
  *H04W 72/04*    (2009.01)
  *H04W 60/02*    (2009.01)
  *H04W 76/27*    (2018.01)

(52) U.S. Cl.
  CPC ....... *H04W 72/0413* (2013.01); *H04W 60/02* (2013.01); *H04W 76/27* (2018.02)

(58) Field of Classification Search
  None
  See application file for complete search history.

(56) References Cited

U.S. PATENT DOCUMENTS

| | | | |
|---|---|---|---|
| 8,045,518 B2 | 10/2011 | Kuo | |
| 2008/0233950 A1* | 9/2008 | Kuo | H04W 36/0055 455/424 |

(Continued)

FOREIGN PATENT DOCUMENTS

| | | |
|---|---|---|
| CN | 1728838 A | 2/2006 |
| CN | 101742555 A | 6/2010 |

(Continued)

OTHER PUBLICATIONS

International Search Report and Written Opinion—PCT/US2013/059254—ISA/EPO—dated Mar. 4, 2014.

*Primary Examiner* — Adnan Baig
(74) *Attorney, Agent, or Firm* — Patterson & Sheridan, LLP

(57) ABSTRACT

Various aspects of the present disclosure enable a plurality of mobile devices (UEs) within a cell to spread out in time their respective transmissions of signaling messages, such as cell update messages, when the network enables or disables enhanced uplink (EUL, sometimes referred to as high-speed uplink packet access or HSUPA) while the UE is in the CELL_FACH state, by changing SIB5 or SIB5bis. In this way, the network load may be reduced, and a network blockage that otherwise might result from large numbers of UEs simultaneously transmitting the cell update message can be avoided. According to one example, a network node may be configured to distribute CELL_UPDATE messages or procedures to UEs when the network node enables or disables EUL in CELL_FACH by changing SIB5 or SIB5bis over time to reduce the network load. According to another (Continued)

example, a UE may be configured for utilizing a random timer or back-off timer to defer cell updates.

32 Claims, 15 Drawing Sheets

(56) References Cited

U.S. PATENT DOCUMENTS

| | | | |
|---|---|---|---|
| 2009/0274086 A1 | 11/2009 | Petrovic et al. | |
| 2010/0135251 A1* | 6/2010 | Sambhwani | H04W 8/26 370/331 |
| 2011/0207465 A1* | 8/2011 | Dwyer et al. | 455/450 |
| 2011/0223915 A1 | 9/2011 | Kwack et al. | |
| 2012/0176951 A1* | 7/2012 | Pradas | H04W 74/08 370/312 |
| 2012/0184253 A1 | 7/2012 | Hsu et al. | |
| 2012/0208527 A1* | 8/2012 | Park | H04W 76/38 455/423 |
| 2012/0275389 A1 | 11/2012 | Kubota et al. | |
| 2013/0130684 A1* | 5/2013 | Gomes | H04W 8/186 455/435.1 |
| 2013/0170479 A1* | 7/2013 | Fong | H04W 72/0446 370/336 |
| 2013/0288729 A1* | 10/2013 | Islam | H04W 76/022 455/509 |
| 2013/0336231 A1* | 12/2013 | Ankel | H04W 72/1268 370/329 |

FOREIGN PATENT DOCUMENTS

| | | |
|---|---|---|
| JP | 2009506643 A | 2/2009 |
| JP | 2011514037 A | 4/2011 |
| JP | 2011517185 A | 5/2011 |
| WO | WO-2007024791 A2 | 3/2007 |
| WO | WO-2009099372 A2 | 8/2009 |
| WO | WO-2009100069 A2 | 8/2009 |
| WO | WO-2009123544 A1 | 10/2009 |
| WO | 2012137078 A2 | 10/2012 |

* cited by examiner

APPARATUS AND METHOD FOR DEFERRING CELL UPDATE MESSAGES FROM USER EQUIPMENT

CROSS-REFERENCE TO RELATED APPLICATIONS

The present Application for Patent claims priority to Provisional Application No. 61/710,514 entitled "APPARATUS AND METHOD FOR SCHEDULING CELL UPDATE MESSAGES FROM USER EQUIPMENT WHEN THE NETWORK ENABLES OR DISABLES ENHANCED UPLINK IN CALL_FACH BY CHANGING SIB5 OR SIB5 BIS" filed Oct. 5, 2012, and assigned to the assignee hereof and hereby expressly incorporated by reference herein.

TECHNICAL FIELD

Aspects of the present disclosure relate generally to wireless communication systems, and more particularly, to scheduling or initiating cell update messages from user equipment when the network node enables or disables enhanced uplink (EUL, sometimes referred to as high-speed uplink packet access or HSUPA) while the UE is in the CELL_FACH state, by changing SIB5 or SIB5bis over time to reduce the network load.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides a method of wireless communication operable on a user equipment (UE). Here, the method may include receiving, while operating in a stand-by state, a broadcast message comprising an information element (IE) configured to turn on or off an enhanced uplink feature, and transmitting a signaling message in response to the receiving of the broadcast message, wherein the transmitting a signaling message follows a withholding of the transmitting until an occurrence of a predetermined event.

Another aspect of the disclosure provides a user equipment (UE) configured for wireless communication. Here, the UE may include means for receiving, while operating in a stand-by state, a broadcast message comprising an information element (IE) configured to turn on or off an enhanced uplink feature, and means for transmitting a signaling message in response to the receiving of the broadcast message, wherein the transmitting a signaling message follows a withholding of the transmitting until an occurrence of a predetermined event.

Another aspect of the disclosure provides a user equipment (UE) configured for wireless communication. Here, the UE may include at least one processor, a memory communicatively coupled to the at least one processor, and a wireless communication interface communicatively coupled to the at least one processor. The at least one processor may be configured to receive, while operating in a stand-by state, a broadcast message comprising an information element (IE) configured to turn on or off an enhanced uplink feature, and to transmit a signaling message in response to the receiving of the broadcast message, wherein the transmitting a signaling message follows a withholding of the transmitting until an occurrence of a predetermined event.

Another aspect of the disclosure provides a non-transitory computer-readable medium operable on a user equipment (UE) configured for wireless communication. Here, the non-transitory computer-readable medium may include instructions for causing a computer to receive, while operating in a stand-by state, a broadcast message comprising an information element (IE) configured to turn on or off an enhanced uplink feature, and instructions for causing a computer to transmit a signaling message in response to the receiving of the broadcast message, wherein the transmitting a signaling message follows a withholding of the transmitting until an occurrence of a predetermined event.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the present disclosure may be configured to distribute cell update messages or procedures from user equipment (UE), when the network enables or disables enhanced uplink (EUL, sometimes referred to as high-speed uplink packet access or HSUPA) while the UE is in the CELL_FACH state, by changing SIB5 or SIB5 bis over time to reduce the network load. According to one example, a network node may be configured to distribute cell update (or CELL_UPDATE, hereinafter referred to interchangeably) messages or procedures to UEs when the network node enables or disables EUL in CELL_FACH by changing SIB5 or SIB5 bis over time to reduce the network load. According to another example, a UE may be configured for utilizing a random timer or back-off timer to defer cell updates.

Figure 1:
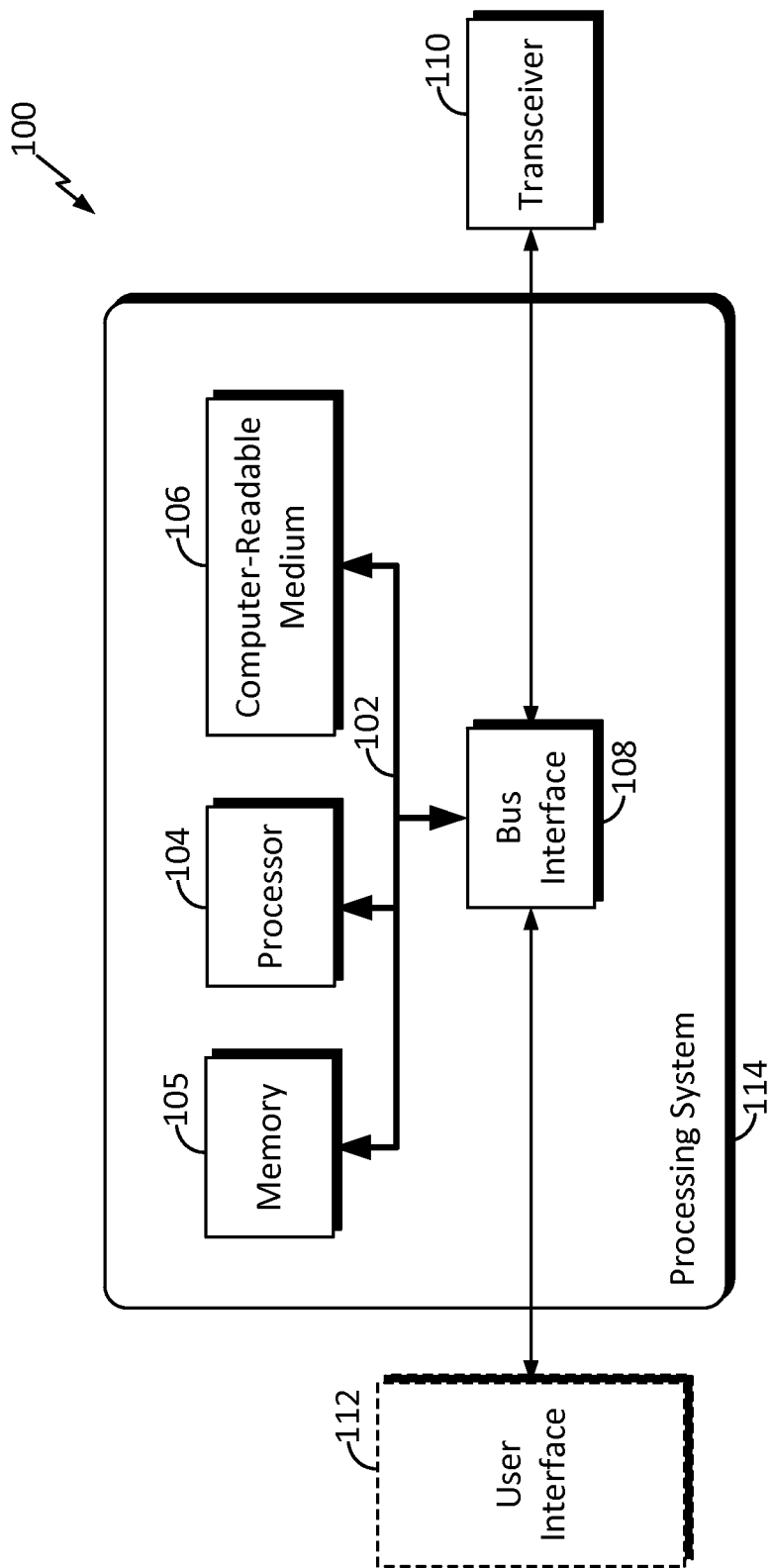
FIG. 1 is a block diagram illustrating an example of a hardware implementation for an apparatus employing a processing system.

FIG. 1 is a conceptual diagram illustrating an example of a hardware implementation for an apparatus 100 employing a processing system 114. In various aspects of the disclosure a UE, a network node (e.g., a radio network controller or RNC, or a base station or Node B) may be embodied as the apparatus 100 employing the processing system 114. That is, in accordance with various aspects of the disclosure, an element, or any portion of an element, or any combination of elements may be implemented with a processing system 114 that includes one or more processors 104. Examples of processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors (represented generally by the processor 104), a memory 105, and computer-readable media (represented generally by the computer-readable medium 106). The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

One or more processors 104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106. The computer-readable medium 106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 106 may reside in the processing system 114, external to the processing system 114, or distributed across multiple entities including the processing system 114. The computer-readable medium 106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 2:
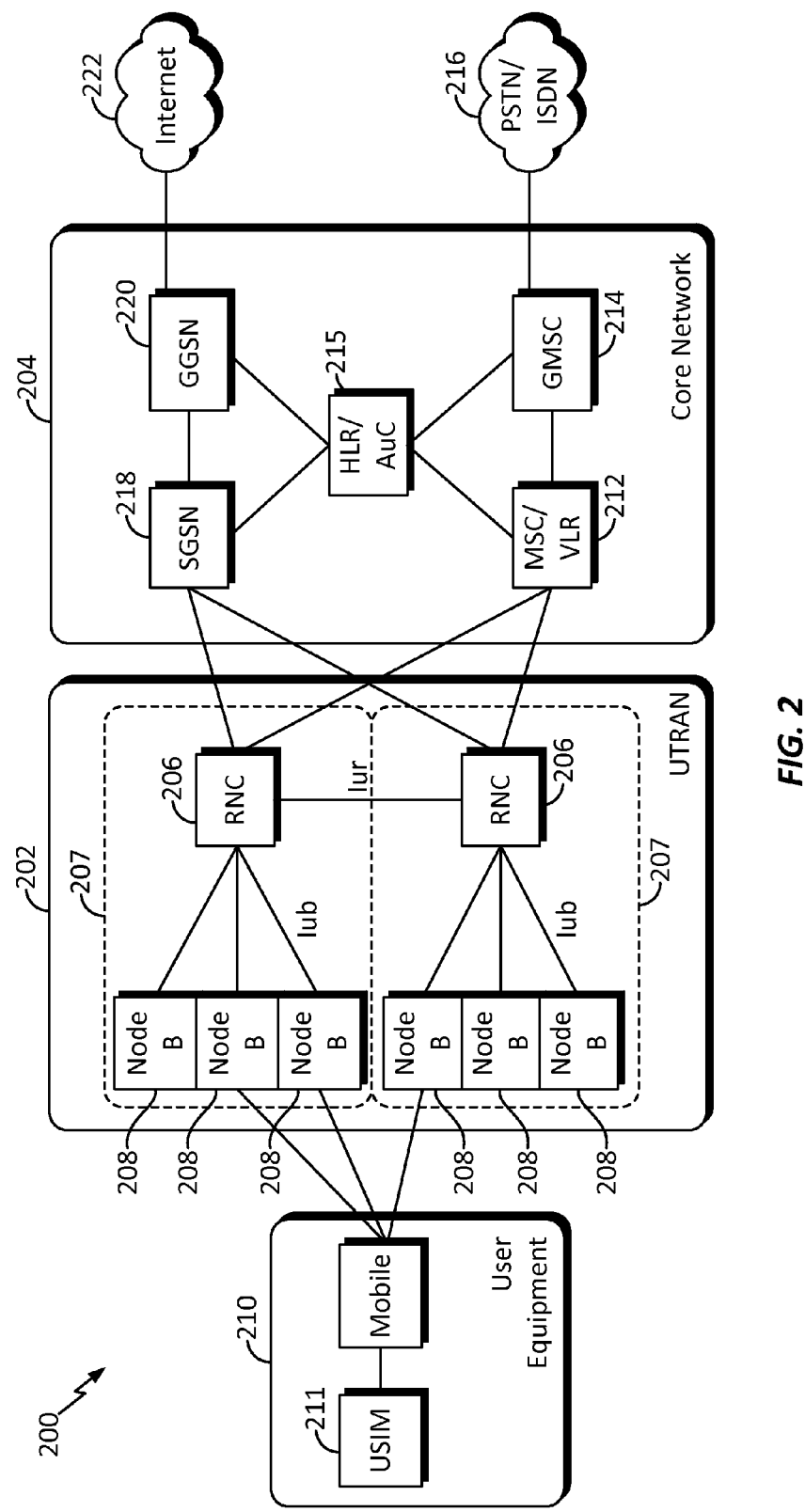
FIG. 2 is a block diagram conceptually illustrating an example of a telecommunications system.

The various concepts presented throughout this disclosure may be implemented across a broad variety of telecommunication systems, network architectures, and communication standards. Referring now to FIG. 2, as an illustrative example without limitation, various aspects of the present disclosure are illustrated with reference to a Universal Mobile Telecommunications System (UMTS) network 200. A UMTS network includes three interacting domains: a core network 204, a radio access network (RAN) (e.g., the UMTS Terrestrial Radio Access Network (UTRAN) 202), and a user equipment (UE) 210. Among several options available for a UTRAN 202, in this example, the illustrated UTRAN 202 may employ a W-CDMA air interface for enabling various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the illustrated RNCs 206 and RNSs 207. The RNC 206 is an apparatus responsible for, among other things, assigning, reconfiguring, and releasing radio resources within the RNS 207. The RNC 206 may be interconnected to other RNCs (not shown) in the UTRAN 202 through various types of interfaces such as a direct physical connection, a virtual network, or the like using any suitable transport network.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a core network 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The downlink (DL), also called the forward link, refers to the communication link from a Node B 208 to a UE 210 and the uplink (UL), also called the reverse link, refers to the communication link from a UE 210 to a Node B 208.

The core network 204 can interface with one or more access networks, such as the UTRAN 202. As shown, the core network 204 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 204 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The illustrated core network 204 also supports packet-switched data services with a serving GPRS support node (SGSN) 218 and a gateway GPRS support node (GGSN) 220. General Packet Radio Service (GPRS) is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

The UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for the UTRAN 202 is based on such DS-CDMA technology and additionally calls for a frequency division duplexing (FDD). FDD uses a different carrier frequency for the uplink (UL) and downlink (DL) between a Node B 408 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface or any other suitable air interface.

In a wireless telecommunication system, the communication protocol architecture may take on various forms depending on the particular application. For example, in a 3GPP UMTS system, the signaling protocol stack is divided into a Non-Access Stratum (NAS) and an Access Stratum (AS). The NAS provides the upper layers, for signaling between the UE 210 and the core network 204 (referring to FIG. 2), and may include circuit switched and packet switched protocols. The AS provides the lower layers, for signaling between the UTRAN 202 and the UE 210, and may include a user plane and a control plane. Here, the user plane or data plane carries user traffic, while the control plane carries control information (i.e., signaling).

Figure 3:
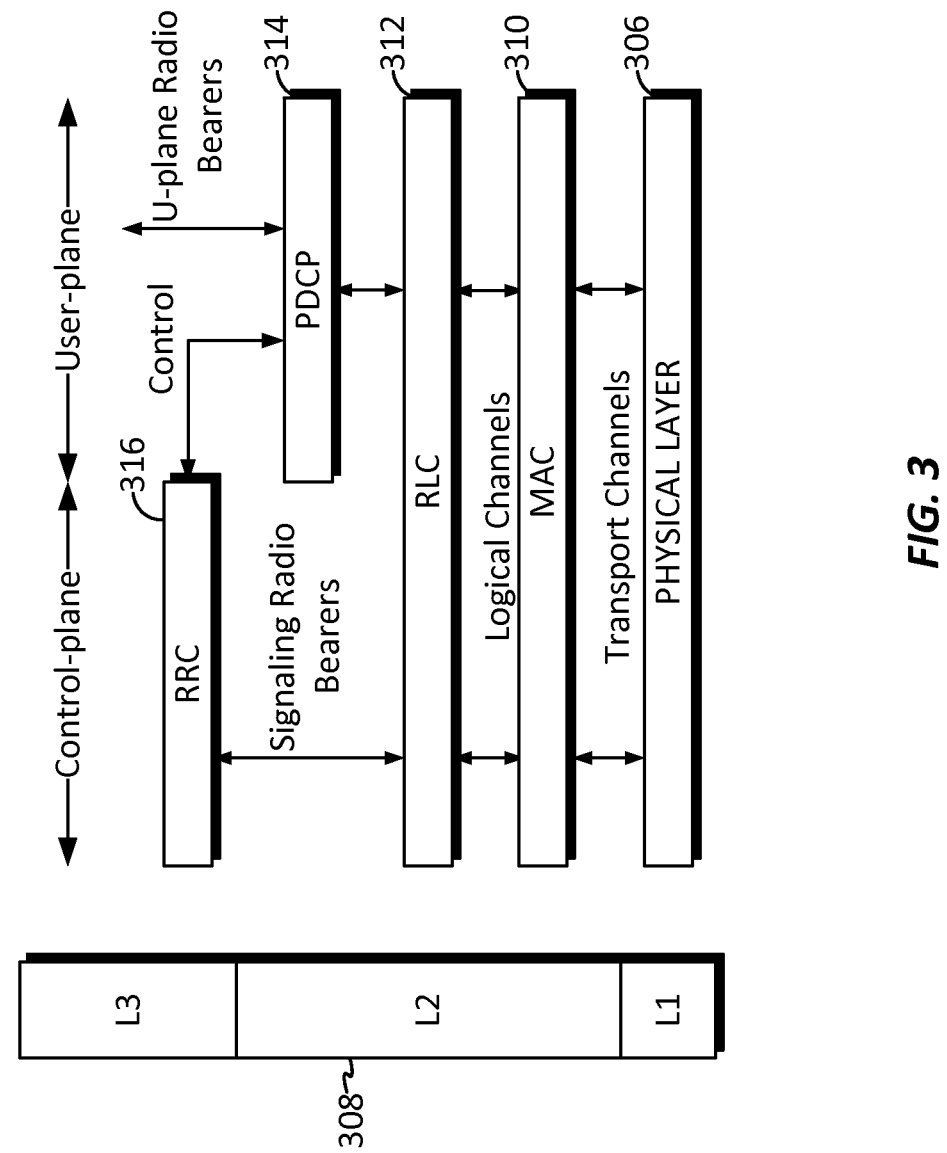
FIG. 3 is a conceptual diagram illustrating an example of a radio protocol architecture for the user and control plane.

Turning to FIG. 3, the AS is shown with three layers: Layer 1, Layer 2, and Layer 3. Layer 1 is the lowest layer and implements various physical layer signal processing functions. Layer 1 will be referred to herein as the physical layer 306. The data link layer, called Layer 2 308, is above the physical layer 306 and is responsible for the link between the UE 210 and Node B 208 over the physical layer 306.

At Layer 3, the RRC layer 316 handles the control plane signaling between the UE 210 and the Node B 208. RRC layer 316 includes a number of functional entities for routing higher layer messages, handling broadcasting and paging functions, establishing and configuring radio bearers, etc. Further, the RRC layer 316 handles state transitions between an idle mode and a connected mode, and within the connected mode, transitions between several service states. These service states include stand-by states such as CELL_FACH, CELL_PCH, and URA_PCH, as well as a connected state CELL_DCH. The various stand-by states provide for and enable different trade-offs between network capacity, call set-up times, battery time, and data speeds.

In the idle mode, the UE performs a variety of functions such as a cell search, acquisition, and establishment of an RRC connection.

In the CELL_DCH state, a dedicated physical channel is allocated to the UE, and the UE is known by its serving RNC on a cell or active set level. Here, the UE generally performs measurements and sends measurement reports according to measurement control information received from the RNC 206.

In the CELL_FACH state, no dedicated physical channel is allocated for the UE, but random access channels (RACHs) and forward access channels (FACHs) may be used instead, for transmitting both signaling messages and small amounts of user-plane data. In this state the UE is also capable of listening to the broadcast channel (BCH) to acquire system information, which may be transmitted on system information blocks (SIBs). In this state, the UE may perform cell reselections, and after a reselection, may transmit a Cell Update message to the RNC 206, so that the RNC knows the UE location. For identification, a cell-radio network temporary identity (C-RNTI) in the MAC header may separate UEs from each other in a cell. When the UE performs cell reselection, it uses a UTRAN RNTI (U-RNTI) when sending the Cell Update message, so that the UTRAN 207 may route the Cell Update message to the current serving RNC of the UE, even if the first RNC receiving the message is not the current SRNC.

In the CELL_PCH state, the UE battery consumption is less than in the CELL_FACH state, since the monitoring of the paging channel (PCH) includes discontinuous reception (DRX) functionality. The UE also listens to system information on the BCH. The URA_PCH state is very similar to the CELL_PCH, except that the UE does not execute Cell Update after each cell reselection, but instead reads UTRAN Registration Area (URA) identities from the BCH, and only if the URA changes (after cell reselection) does UE inform its location to the SRNC.

In the illustrated air interface, the L2 layer 308 is split into sublayers. In the control plane, the L2 layer 308 includes two sublayers: a medium access control (MAC) sublayer 310 and a radio link control (RLC) sublayer 312. In the user plane, the L2 layer 308 additionally includes a packet data convergence protocol (PDCP) sublayer 314. Although not shown, the UE may have several upper layers above the L2 layer 308 including a network layer (e.g., IP layer) that is terminated at a PDN gateway on the network side and an application layer that is terminated at the other end of the connection (e.g., far end UE, server, etc.).

The PDCP sublayer 314 provides multiplexing between different radio bearers and logical channels. The PDCP sublayer 314 also provides header compression for upper layer data packets to reduce radio transmission overhead, security by ciphering the data packets, and handover support for UEs between Node Bs.

The RLC sublayer 312 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any PDU exchanged between peer entities.

The MAC sublayer 310 provides multiplexing between logical and transport channels. The MAC sublayer 310 is also responsible for allocating the various radio resources (e.g., resource blocks) in one cell among the UEs. The MAC sublayer 310 is also responsible for HARQ operations.

Figure 4:
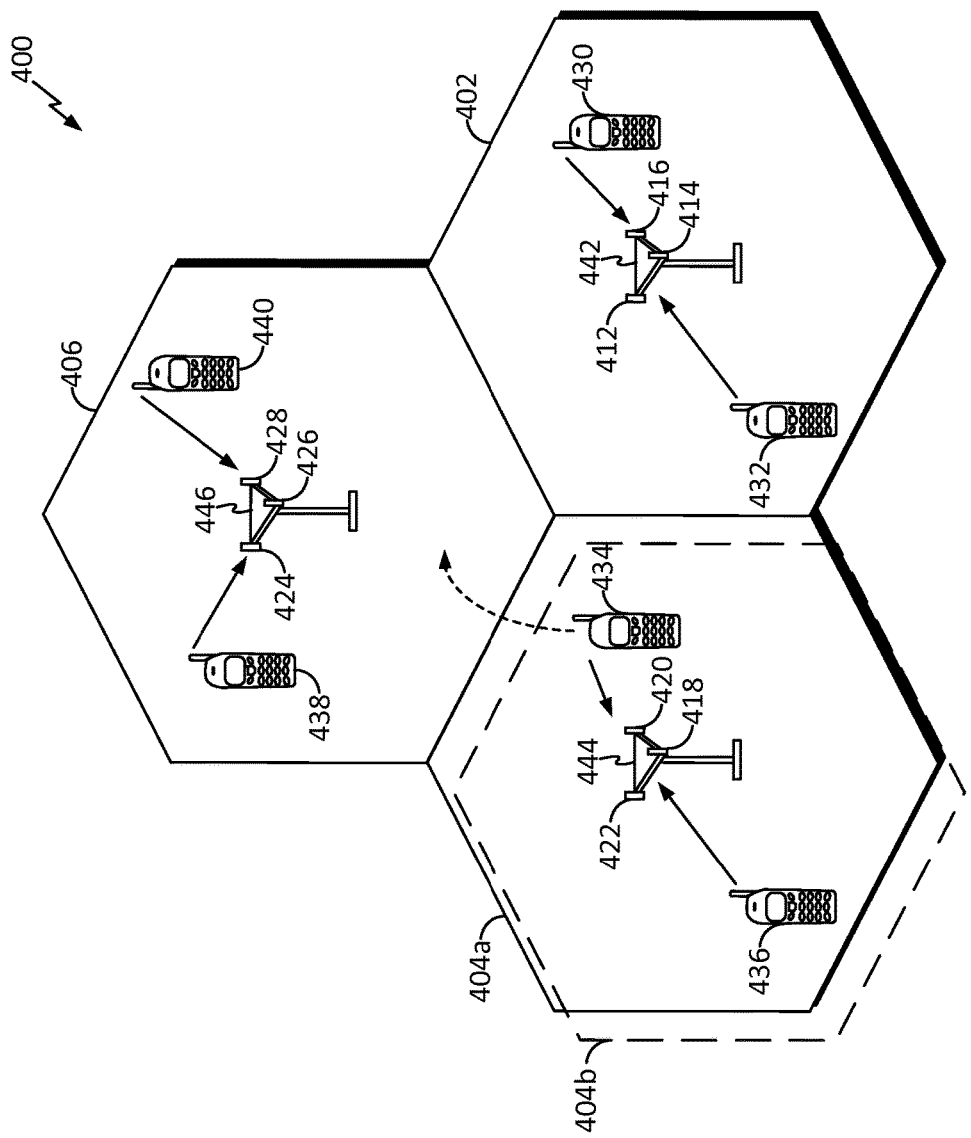
FIG. 4 is a conceptual diagram illustrating an example of an access network.

The UTRAN 202 is one example of a RAN that may be utilized in accordance with the present disclosure. Referring now to FIG. 4, by way of example and without limitation, a simplified schematic illustration of a RAN 400 in a UTRAN architecture is illustrated. The system includes multiple cellular regions (cells), including cells 402, 404, and 406, each of which may include one or more sectors. Cells may be defined geographically (e.g., by coverage area) and/or may be defined in accordance with a frequency, scrambling code, etc. That is, the illustrated geographically-defined cells 402, 404, and 406 may each be further divided into a plurality of cells, e.g., by utilizing different scrambling codes. For example, cell 404a may utilize a first scrambling code, and cell 404b, while in the same geographic region and served by the same Node B 444, may be distinguished by utilizing a second scrambling code.

In a cell that is divided into sectors, the multiple sectors within a cell can be formed by groups of antennas with each antenna responsible for communication with UEs in a portion of the cell. For example, in cell 402, antenna groups 412, 414, and 416 may each correspond to a different sector. In cell 404, antenna groups 418, 420, and 422 may each correspond to a different sector. In cell 406, antenna groups 424, 426, and 428 may each correspond to a different sector.

The cells 402, 404, and 406 may include several UEs that may be in communication with one or more sectors of each cell 402, 404, or 406. For example, UEs 430 and 432 may be in communication with Node B 442, UEs 434 and 436 may be in communication with Node B 444, and UEs 438 and 440 may be in communication with Node B 446. Here, each Node B 442, 444, and 446 may be configured to provide an access point to a core network 204 (see FIG. 2) for all the UEs 430, 432, 434, 436, 438, and 440 in the respective cells 402, 404, and 406.

During a call with a source cell, or at any other time, the UE 436 may monitor various parameters of the source cell as well as various parameters of neighboring cells. Further, depending on the quality of these parameters, the UE 436 may maintain communication with one or more of the neighboring cells. During this time, the UE 436 may maintain an Active Set, that is, a list of cells to which the UE 436 is simultaneously connected (i.e., the UTRAN cells that are currently assigning a downlink dedicated physical channel DPCH or fractional downlink dedicated physical channel F-DPCH to the UE 436 may constitute the Active Set).

Figure 5:
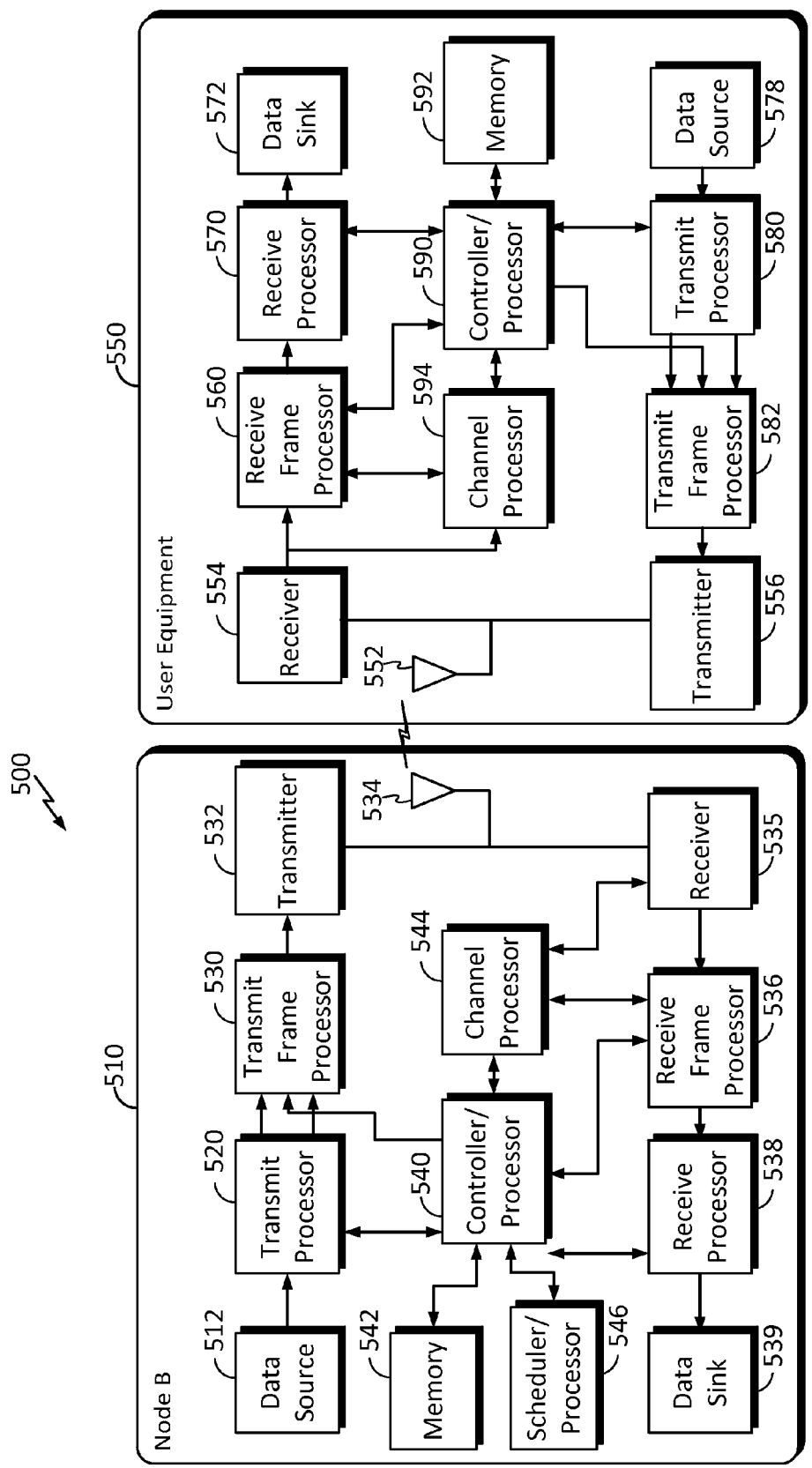
FIG. 5 is a block diagram conceptually illustrating an example of a Node B in communication with a UE in a telecommunications system.

FIG. 5 is a block diagram of an exemplary Node B 510 in communication with an exemplary UE 550, where the Node B 510 may be the Node B 208 in FIG. 2, and the UE 550 may be the UE 210 in FIG. 2. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

A high speed packet access (HSPA) air interface includes a series of enhancements to the 3G/W-CDMA air interface between the UE 550 and the Node B 510, facilitating greater throughput and reduced latency for users. Among other modifications over prior standards, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink or EUL).

For example, in Release 5 of the 3GPP family of standards, HSDPA was introduced. HSDPA utilizes as its transport channel the high-speed downlink shared channel (HS-DSCH), which may be shared by several UEs. The HS-DSCH is implemented by three physical channels: the high-speed physical downlink shared channel (HS-PDSCH), the high-speed shared control channel (HS-SCCH), and the high-speed dedicated physical control channel (HS-DPCCH).

The HS-SCCH is a physical channel that may be utilized to carry downlink control information related to the transmission of HS-DSCH. Here, the HS-DSCH may be associated with one or more HS-SCCH. The UE may continuously monitor the HS-SCCH to determine when to read its data from the HS-DSCH and to determine the modulation scheme used on the assigned physical channel.

The HS-PDSCH is a physical channel that may be shared by several UEs and may carry downlink data for the high-speed downlink. The HS-PDSCH may support quadrature phase shift keying (QPSK), 16-quadrature amplitude modulation (16-QAM), and multi-code transmission.

The HS-DPCCH is an uplink physical channel that may carry feedback from the UE to assist the Node B in its scheduling algorithm. The feedback may include a channel quality indicator (CQI) and a positive or negative acknowledgement (ACK/NAK) of a previous HS-DSCH transmission.

3GPP Release 6 specifications introduced uplink enhancements referred to as Enhanced Uplink (EUL) or High Speed Uplink Packet Access (HSUPA). HSUPA utilizes as its transport channel the EUL Dedicated Channel (E-DCH). The E-DCH is transmitted in the uplink together with the Release 99 DCH. The control portion of the DCH, that is, the DPCCH, carries pilot bits and downlink power control commands on uplink transmissions.

The E-DCH is implemented by physical channels including the E-DCH Dedicated Physical Data Channel (E-DPDCH) and the E-DCH Dedicated Physical Control Channel (E-DPCCH). In addition, HSUPA relies on additional physical channels including the E-DCH HARQ Indicator Channel (E-HICH), the E-DCH Absolute Grant Channel (E-AGCH), and the E-DCH Relative Grant Channel (E-RGCH).

Figure 6:
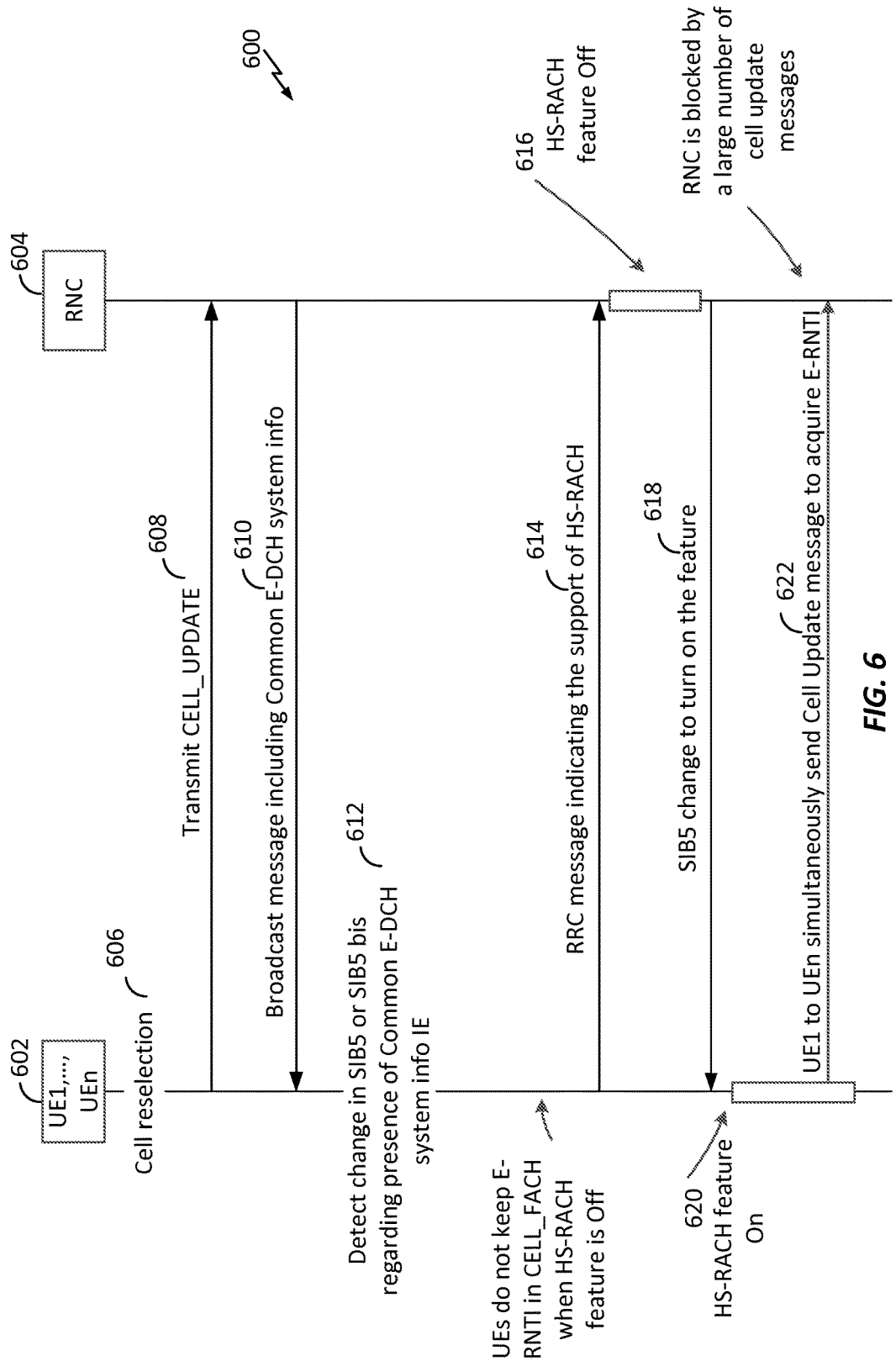
FIG. 6 is a call flow diagram illustrating a typical cell update procedure between a plurality of UEs and a network node such as the RNC for updating the UEs when a change in SIB5 or SIB5 bis is broadcast by the network node.

Typical Cell Update Procedure between UEs and Network Node—Enhanced Uplink Feature Turned On FIG. 6 is a call flow diagram 600 illustrating a typical cell update procedure between a plurality of UEs 602 and a network node such as an RNC 604. In a particular implementation, the UEs 602 may be the same as the apparatus 100 (see FIG. 1), the UE 210 (see FIG. 2), or the UE 550 (see FIG. 5); and the RNC 604 may be the same as the RNC 206 (see FIG. 2), as described above.

That is, one optional feature in EUL or HSUPA, introduced in Release-8 standards, provides for the UE to utilize the E-DCH for high-speed uplink communication while in the CELL_FACH state. This feature is referred to herein below as an HS-RACH feature, although any suitable terminology may be utilized. In general, the disclosure relates to any feature wherein a high-speed uplink channel may be enabled for a UE to utilize while in any stand-by state, including but not limited to the CELL_FACH state.

In current standards, if the network supports the HS-RACH feature, the network can control the availability of the HS-RACH feature by broadcasting a certain Information Element (IE) called "Common E-DCH system info," e.g., in SIB5 or SIB5bis. In this way, by detecting the presence or absence of this IE, the UE can determine whether the network is capable of the HS-RACH feature.

From the perspective of the UE, if the presence of the Common E-DCH system info IE in SIB5 or SIB5bis changes (i.e., the IE appears or disappears in the broadcasted system information block), the UE may believe that a cell change has occurred, either from a HS-RACH-capable cell to a non-HS-RACH-capable cell, or vice versa. This may result in performance degradation in the network, as described below.

As shown in FIG. 6, one or more UEs from among a plurality of UEs 602, labeled UE1-UEn, may perform a cell reselection 606, and after the reselection, may transmit a cell update message 608 to the RNC 604. In response, the RNC 604 may transmit a broadcast message 610 including the Common E-DCH system info IE, to the UEs 602. Here, by detecting the presence of this IE at 612, the UEs 602 may realize that the network supports HS-RACH. Once the UEs realize the network supports HS-RACH, each of the UEs UE1-UEn may be reconfigured according to the configuration information contained in the Common E-DCH system info IE. Next, to be able to use the E-DCH resource for high-speed uplink transmissions, each of the UEs 602 may attempt to acquire an E-DCH Radio Network Temporary Identifier (E-RNTI), as the UEs would not have the E-RNTI when the HS-RACH feature is Off.

To acquire the E-RNTI, the UEs 602 may each initiate a CELL_UPDATE message or procedure with the RNC 604 to attempt to acquire their respective E-RNTI from the network. If a UE already has an E-RNTI, that particular UE may be ready for uplink transmission utilizing E-DCH resources, so no CELL_UPDATE would be required for that UE.

To initiate the CELL_UPDATE message or procedure, each UE may transmit a signaling message (e.g., an RRC message) 614 to the RNC 604 indicating the UE's support of HS-RACH. At 616, the RNC 604 may determine that the HS-RACH feature is Off, and may accordingly broadcast a SIB5 or SIB5bis change 618 to the UEs 602 to turn On the HS-RACH feature. In response, at 620 the UEs (UE1-UEn) may turn the HS-RACH feature On and may then simultaneously send a CELL_UPDATE message 622 to the RNC 604 to acquire the E-RNTI.

However, all the UEs simultaneously requesting this update may cause a serious system performance degradation or even block the network, especially during peak hours, as a large number of UEs may simultaneously trigger and send the CELL_UPDATE message to the network. More importantly, a high priority emergency call might not be able to access the network because all available preamble signatures might be occupied by the UEs trying to a send the CELL_UPDATE message 622. This system performance degradation may typically be a result of the operator not sufficiently investing in new hardware to expand the network capacity.

According to current specifications, the network may open up to 32 E-DCH resources for EUL in CELL_FACH. Consequently, the available resources for CELL_DCH are reduced. As such, the network may turn off the HS-RACH feature during peak hours to allow all available resources to be only used in CELL_DCH state.

A similar problem may also occur when the network turns off the HS-RACH feature by not including the "Common E-DCH system info" IE in SIB5 or SIB5bis. In this case, the UEs 602 may need to re-establish their RLC entity and then initiate the cell update procedure.

Therefore, to address these and other issues, one or more aspects of the present disclosure enable a network to more efficiently offer the HS-RACH feature in a way that may reduce or prevent the performance degradation from such potentially large numbers of UEs simultaneously requesting a Cell Update.

Enhanced Uplink Feature Turned On—Back-Off Timer

Figure 7:
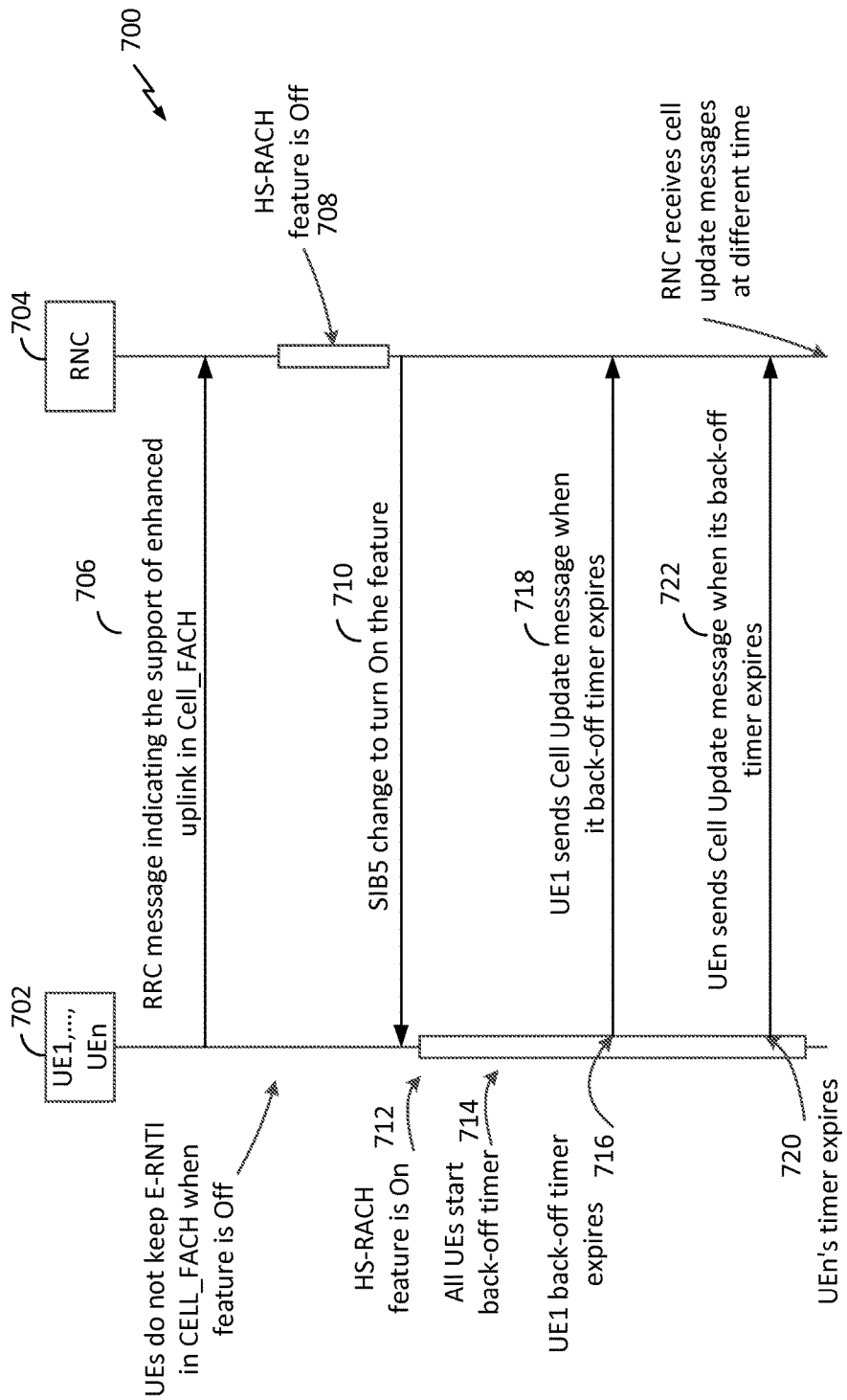
FIG. 7 is a call flow diagram illustrating a plurality of UEs utilizing a back-off, or random, timer to defer cell updates to the network, according to one example.

For example, FIG. 7 is a call flow diagram 700 illustrating an exemplary process according to some aspects of the present disclosure, wherein a plurality of UEs 702 may utilize a randomized back-off timer to defer cell updates with a network node 704. In a particular implementation, the UEs 702 may be the same as the apparatus 100 (see FIG. 1), the UE 210 (see FIG. 2), or the UE 550 (see FIG. 5); and the RNC 704 may be the same as the RNC 206 (see FIG. 2), as described above.

As described above, if the network supports the HS-RACH feature, the network can control the availability of the HS-RACH feature by broadcasting the Common E-DCH system info IE, e.g., in SIB5 or SIB5bis. By detecting the presence or absence of this IE, the UE can determine whether the network is capable of the HS-RACH feature. From the perspective of the UE, if the presence of the Common E-DCH system info IE in SIB5 or SIB5bis changes (i.e., the IE appears or disappears in the broadcasted system information block), the UE may believe that a cell change has occurred, either from a HS-RACH-capable cell to a non-HS-RACH-capable cell, or vice versa.

As shown in FIG. 7, by detecting the presence of this IE, a plurality of UEs 702, labeled UE1-UEn may realize that the network supports HS-RACH. Once the UEs realize that the network supports HS-RACH, each of the UEs UE1-UEn may be reconfigured according to the configuration information contained in the Common E-DCH system info IE. Next, to be able to use the E-DCH resource for high-speed uplink transmissions, each of the UEs 702 may attempt to acquire an E-RNTI, as the UEs would not have the E-RNTI when the HS-RACH feature is Off.

To acquire the E-RNTI, the UEs may each initiate a CELL_UPDATE message or procedure with the RNC 704 to attempt to acquire their respective E-RNTI from the network. If a UE already has an E-RNTI, that particular UE may be ready for high-speed uplink transmission utilizing E-DCH resources, so no Cell Update would be required for that UE.

To initiate the CELL_UPDATE message or procedure, the UE may transmit an RRC message 706 to the RNC 704 indicating the UE's support of HS-RACH. At 708, the RNC 704 may determine that the HS-RACH feature is Off, and may accordingly broadcast a SIB5 change 710 to the UEs 702 to turn On the HS-RACH feature. In response, at 712 the UEs (UE1-UEn) may turn the HS-RACH feature On.

Here, in accordance with an aspect of the present disclosure, at 714, each UE 702 may turn On a back-off timer. In a further aspect of the disclosure, the time associated with the back-off timer may be a random value, such that it is unlikely that any two UEs among the plurality of UEs UE1-UEn take the same value for their respective back-off timers. Here, the back-off timers may be utilized to defer cell updates, so that the RNC 704 does not receive a large amount of cell updates at the same time. Thus, the UEs 702 will have different timing relative to one another, and updates can be relatively evenly distributed in time. That is, by utilizing the randomized back-off timers described herein, the RNC 704 may receive the CELL_UPDATE messages at different times.

That is, in an aspect of the disclosure, each UE 702 may transmit a CELL_UPDATE message, upon expiration of its respective back-off timer, to the RNC 704 to acquire the E-RNTI. According to one example, the expiration 716 of a first back-off timer associated with a first UE (UE1) may trigger UE1 to transmit a CELL_UPDATE message 718 to the RNC 704 to acquire the E-RNTI. The expiration 720 of a second back-off timer associated with an $n^{th}$ UE (UEn) may trigger UEn to transmit a CELL_UPDATE message 722 to the RNC 704 to acquire the E-RNTI.

Enhanced Uplink Feature Turned On—Different Times

Figure 8:
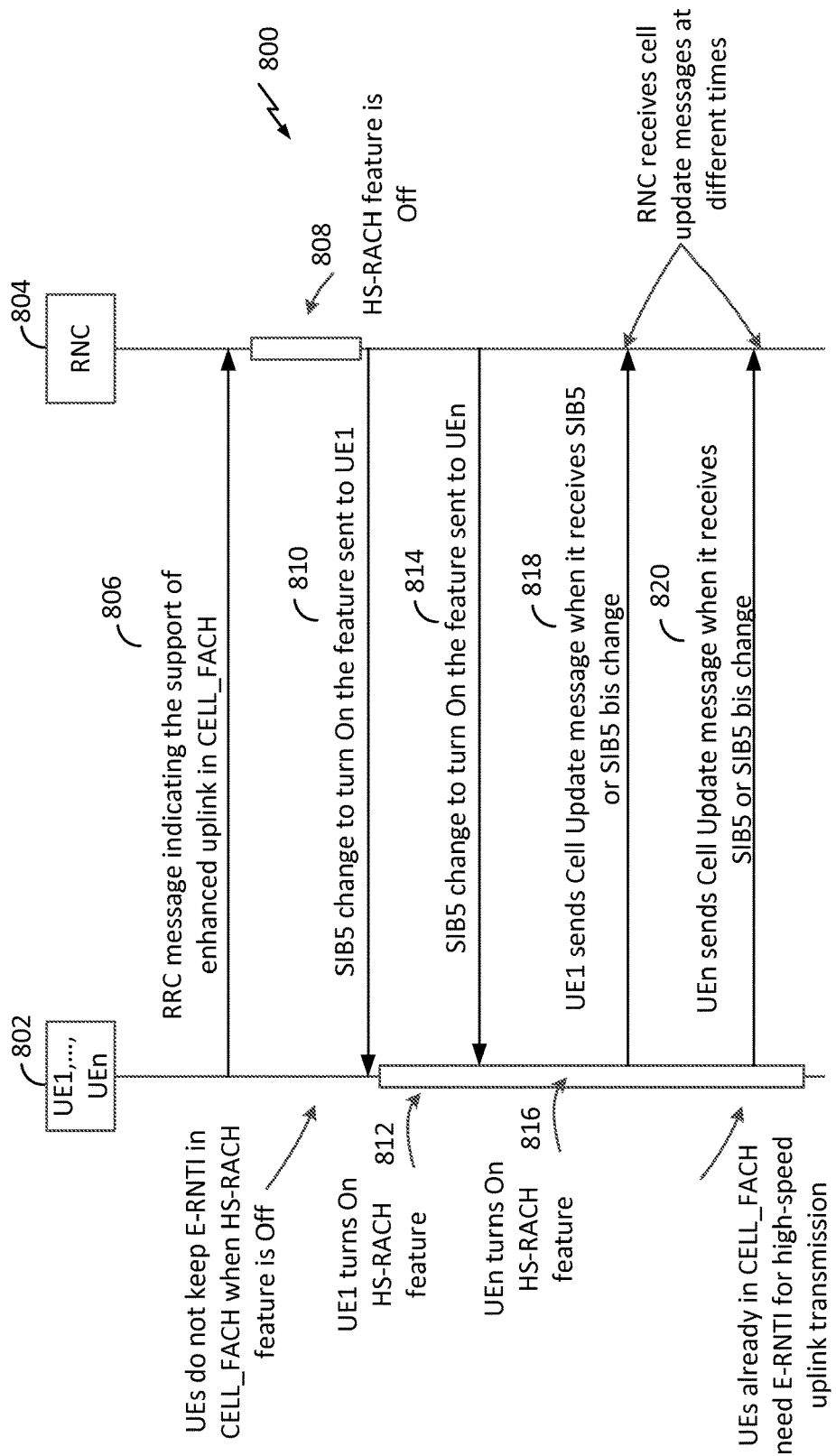
FIG. 8 is a call flow diagram illustrating a network node configured to schedule SIB5 or SIB5 bis updates for different sets of UEs at different times, according to one example.

FIG. 8 is a call flow diagram 800 illustrating an exemplary process according to some aspects of the present disclosure, wherein a network node may be configured to schedule SIB5 or SIB5bis updates for different sets of UEs at different times. The cell update procedure described herein may occur between a plurality of UEs 802 and a network node, e.g., the RNC 804. In a particular implementation, the UEs 802 may be the same as the apparatus 100 (see FIG. 1), the UE 210 (see FIG. 2), or the UE 550 (see FIG. 5); and the RNC 804 may be the same as the RNC 206 (see FIG. 2), as described above.

As described above, if the network supports the HS-RACH feature, the network can control the availability of the HS-RACH feature by broadcasting the Common E-DCH system info IE, e.g., in SIB5 or SIB5 bis. By detecting the presence or absence of this IE, the UE 802 can determine whether the network is capable of the HS-RACH feature. From the perspective of the UE, if the presence of the Common E-DCH system info IE in SIB5 or SIB5bis changes (i.e., the IE appears or disappears in the broadcasted system information block), the UE may believe that a cell change has occurred, either from a HS-RACH-capable cell to a non-HS-RACH-capable cell, or vice versa.

As shown in FIG. 8, by detecting the presence of this IE, a plurality of UEs 802, labeled UE1-UEn may realize the network supports HS-RACH. Once the UEs realize that the network supports HS-RACH, each of the UEs UE1-UEn may be reconfigured according to the configuration information contained in the Common E-DCH system info IE. Next, to be able to use the E-DCH resource for high-speed uplink transmissions, each of the UEs 802 may attempt to acquire an E-RNTI, as the UEs would not have the E-RNTI when the HS-RACH feature is Off.

To acquire the E-RNTI, the UEs 804 may each initiate a CELL_UPDATE message or procedure with the RNC 804 to attempt to acquire their respective E-RNTI from the network. If a UE already has an E-RNTI, that particular UE may be ready for high-speed uplink transmission utilizing E-DCH resources, so no CELL_UPDATE would be required for that UE.

To initiate the CELL_UPDATE message or procedure, each UE may transmit an RRC message 806 to the RNC 804 indicating the UE's support of HS-RACH. At 808, the RNC 804 may determine that the HS-RACH feature is Off, and, in accordance with an aspect of the disclosure, may accordingly broadcast a SIB5 or SIB5bis change 810 to different sets of UEs, at different points in time, to turn On the HS-RACH feature 810. By updating different sets of UEs at different points of time, the RNC 804 can reduce or prevent the reduction of available resources in the network, as the RNC 804 receives the CELL_UPDATE messages at different times. In various aspects of the disclosure, each set of UEs to which a SIB5 or SIB5bis change is transmitted may include any suitable number of UEs, e.g., one or more UEs.

According to one example, the RNC 804 may send a first SIB5 change 810 to a first UE (UE1), or to a first set of UEs, to turn On the HS-RACH feature. Accordingly, at 812, UE1 may then turn On the HS-RACH feature. At 814, the RNC 804 may then send a second SIB5 change to a second UE (UEn) or a second set of UEs to turn On the HS-RACH feature. Accordingly, at 816, UEn may then turn On the HS-RACH feature.

In response, each UE or set of UEs may send a CELL_UPDATE message to the RNC 804 to acquire an E-RNTI. That is, receiving a SIB5 change from the RNC 804 may trigger UE1 to send a CELL_UPDATE 818 to the RNC 804 to acquire an E-RNTI. Similarly, receiving a SIB5 change from the RNC 804 may trigger UEn to send a CELL_UPDATE 820 to the RNC 804 to acquire an E-RNTI.

According to one example, two types of paging, Type I and Type II, in UMTS may be used. In accordance with an aspect of the disclosure, a particular type of paging may be addressed to a particular set of UEs, and from that message, the particular set of UEs may realize that SIB5 or SIB5bis has changed. In some examples, this SIB change indicator may be transmitted on the broadcast channel, but the indicator may be sent through Type I paging. As such, only the UEs in the first set that receive Type I paging would know that the system information has changed.

According to another example, the different groups or sets of UEs may be defined in the standards for UMTS, and the RNC 804 may transmit the E-RNTI to one set at a time. In this example, a SIB change indicator may be inside the special paging type message directed to a particular set of UEs. Thus, the UEs may not be looking at the SIB5 or SIB5bis themselves, but rather at the SIB change indictor, which may indicate that the SIB5 or SIB5bis has changed, for example, that the HS-RACH feature has been turned On. Enhanced Uplink Feature Turned On—RLC Layer has Data to Transmit In a further aspect of the disclosure, UEs may be configured to postpone the transmission of the cell update request until such a time as there is data ready for transmission utilizing the high-speed uplink (e.g., the E-DCH) in CELL_FACH. In this way, as described in further detail below, the timing of UE transmissions of the cell update request that may be triggered by a SIB5 or SIB5bis change can be spread out over time.

Figure 9:
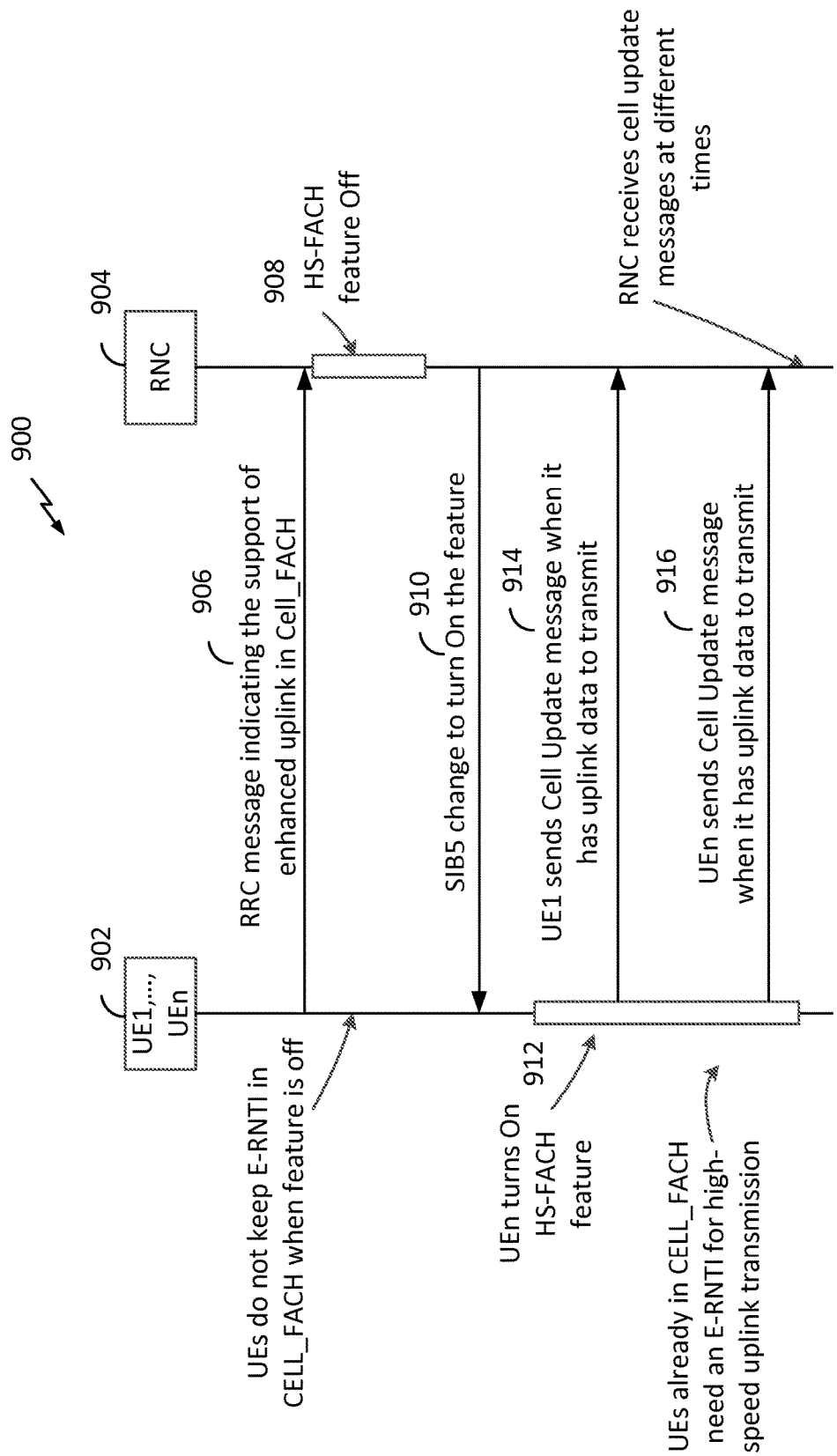
FIG. 9 is a call flow diagram illustrating a UE in CELL_FACH that reads a change in SIB5 or SIB5bis and initiate a cell update message or procedure when the RLC layer of the UE has uplink data to transmit, according to one example.

For example, FIG. 9 is a call flow diagram 900 illustrating an exemplary process according to some aspects of the present disclosure, wherein a plurality of UEs 902 in a CELL_FACH state (labeled UE1-UEn) may read a change in SIB5 or SIB5bis, and in response, may initiate a cell update procedure with the RNC 904 only at such a time when the RLC layer of the respective UE has uplink data to transmit. In a particular implementation, the UEs 902 may be the same as the apparatus 100 (see FIG. 1), the UE 210 (see FIG. 2), or the UE 550 (see FIG. 5); and the RNC 904 may be the same as the RNC 206 (see FIG. 2), as described above.

As described above, if the network supports the HS-RACH feature, the network can control the availability of the HS-RACH feature by broadcasting the Common E-DCH system info IE, e.g., in SIB5 or SIB5bis. By detecting the presence or absence of this IE, the UE can determine whether the network is capable of the HS-RACH feature. From the perspective of the UE, if the presence of the Common E_ECH system info IE in SIB5 or SIB5bis changes (i.e., the IE appears or disappears in the broadcasted system information block), the UE may believe that a cell change has occurred, either from a HS-RACH-capable cell to a non-HS-RACH-capable cell, or vice versa.

In a particular implementation, when the UE reads a change in SIB5 or SIB5bis, rather than immediately initiating a cell update message or procedure, the UE may hold the initiation of the cell update message or procedure until an upper layer (e.g., the RLC layer) has uplink data to transmit/send. As such, because the plurality of UEs may have different timing of data to transmit, updates can be more evenly distributed. Thus, when the UE has RLC data to send, the UE may then attempt to acquire an E-RNTI.

As shown in FIG. 9, by detecting the presence of the Common E-DCH system info IE, a plurality of UEs 902, labeled UE1-UEn, may realize that the network supports HS-RACH. Once the UEs 902 have determined that the network supports HS-RACH, each of the UEs UE1-UEn may be reconfigured according to the configuration information contained in the Common E-DCH system info IE. Next, to be able to use the E-DCH resource for high-speed uplink transmission, each of the UEs may attempt to acquire an E-RNTI, as the UEs would not have the E-RNTI when the HS-RACH feature is Off.

To acquire the E-RNTI, the UEs may each initiate a CELL_UPDATE message or procedure with the RNC 904 to attempt to acquire their respective E-RNTI from the network. If a UE already has the E-RNTI, that particular UE may be ready for high-speed uplink transmission utilizing E-DCH resources, so no Cell Update would be required for that UE.

To initiate the CELL_UPDATE message or procedure, the UE may transmit a RRC message 906 to the RNC 904 indicating the UE's support of HS-RACH. At 908, the RNC 904 may determine that the HS-RACH feature is Off, and may accordingly broadcast a SIB5 change 910 to the UEs 902 to turn On the HS-RACH feature. In response, at 912 the UEs (UE1-UEn) may turn the HS-RACH feature On.

Here, in accordance with an aspect of the present disclosure, each UE 902 may withhold initiation of a cell update message or procedure until such a time as that particular UE has uplink data to transmit (e.g., when the UE has data ready for transmission on an uplink data channel, such as the DCCH or DTCH). Here, for example, the RLC layer at the UE may be capable of determining that one or more data packets are ready for transmission, and may accordingly be configured to make such information available so that the UE may delay transmission of the Cell Update until this data is ready for transmission. For example, at 914, when a first UE (e.g., UE1) has uplink data to transmit, UE1 may transmit a cell update message to the RNC 904 to acquire the E-RNTI. Similarly, when any other UE of the plurality of UEs 902 has uplink data to transmit, at 916, that UE may then send a cell update message to the RNC 904 to acquire the E-RNTI. By sending cell update messages when they have uplink data to transmit, the UEs 902 can reduce or prevent the reduction of available resources in the network, as the RNC 904 receives the cell update messages at different times.

Figure 10:
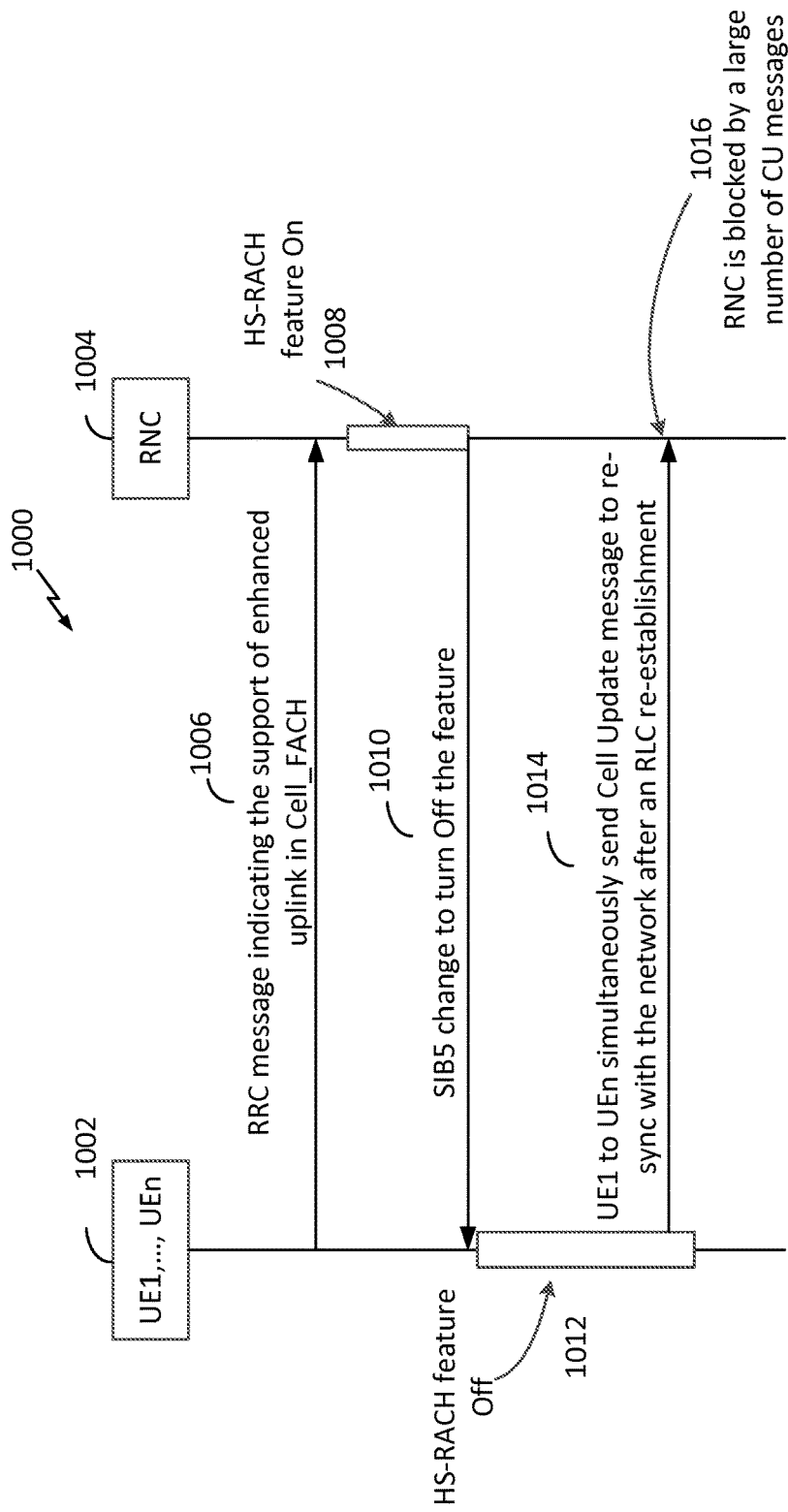
FIG. 10 is a call flow diagram illustrating a typical cell update procedure between a plurality of UEs and a network node such as the RNC for updating the UEs when a change in SIB5 or SIB5 bis (e.g., the enhanced uplink feature has been turned off) is broadcast.

Typical Cell Update Procedure between UEs and Network Node—Enhanced Uplink Feature Turned Off FIG. 10 is a call flow diagram 1000 illustrating a typical cell update procedure between a plurality of UEs 1002 and a network node such as an RNC 1004. In a particular implementation, the UEs 1002 may be the same as the apparatus 100 (see FIG. 1), the UE 210 (see FIG. 2), or the UE 550 (see FIG. 5); and the RNC 1004 may be the same as the RNC 206 (see FIG. 2), as described above.

In current standards, if the network supports the HS-RACH feature, the network can control the availability of the HS-RACH feature by broadcasting the Common E-DCH system info IE, e.g., in SIB5 or SIB5bis. In this way, by detecting the presence or absence of this IE, the UE can determine whether the network is capable of the HS-RACH feature.

From the perspective of the UE, if the presence of the Common E-DCH system info IE in SIB5 or SIB5bis changes (i.e., the IE appears or disappears in the broadcasted system information block), the UE may believe that a cell change has occurred, either from a HS-RACH-capable cell to a non-HS-RACH-capable cell, or vice versa. This may result in performance degradation in the network, as described below.

As shown in FIG. 10, by detecting the presence of this IE, a plurality of UEs 1002, labeled UE1-UEn may realize that the network supports HS-RACH. Once the UEs realize that the network supports HS-RACH, each of the UEs UE1-UEn may transmit an RRC message 1006 indicating to the RNC 1004 the UE's support of HS-RACH. However, in some implementations where the HS-RACH feature is currently On, at 1008 the RNC 1004 may determine that an RLC re-establishment is desirable, e.g., to re-establish an RLC connection between the UEs 1002 and the RNC 1004. When such an RLC re-establishment is desirable, the RNC 1004 may transmit a SIB5 change 1010 to the UEs 1002 to turn Off the HS-RACH feature 1010. At 1012 the UEs 1002 may then turn Off the HS-RACH feature, and at 1014, may each simultaneously transmit CELL_UPDATE messages to the RNC 1004 to re-sync with the network after the RLC re-establishment.

However, as in the problem scenario described above and illustrated in FIG. 6, in this case, at 1016 all the UEs requesting this update at the same time may cause serious system performance degradation or even block the network, especially during peak hours, as a large number of UEs may simultaneously trigger and send the CELL_UPDATE message to the network. More importantly, a high priority emergency call might not be able to access the network because all available preamble signatures might be occupied by the UEs trying to a send the CELL_UPDATE message 1014. As described above, the system performance degradation may typically be a result of the operator not investing in new hardware to expand the network capacity.

According to current specifications, the network may open up to 32 E-DCH resources for EUL in CELL_FACH. Consequently, the available resources for CELL_DCH are reduced. As such, the network may turn off the HS-RACH feature during peak hours to allow all available resources to be only used in CELL_DCH state.

Therefore, to address these and other issues, one or more aspects of the present disclosure enable a network to more efficiently offer the HS-RACH feature in a way that may reduce or prevent the performance degradation from such potentially large numbers of UEs simultaneously requesting a Cell Update to re-sync with the network after RLC re-establishment.

Enhanced Uplink Feature Turned Off—Random Timer

Figure 11:
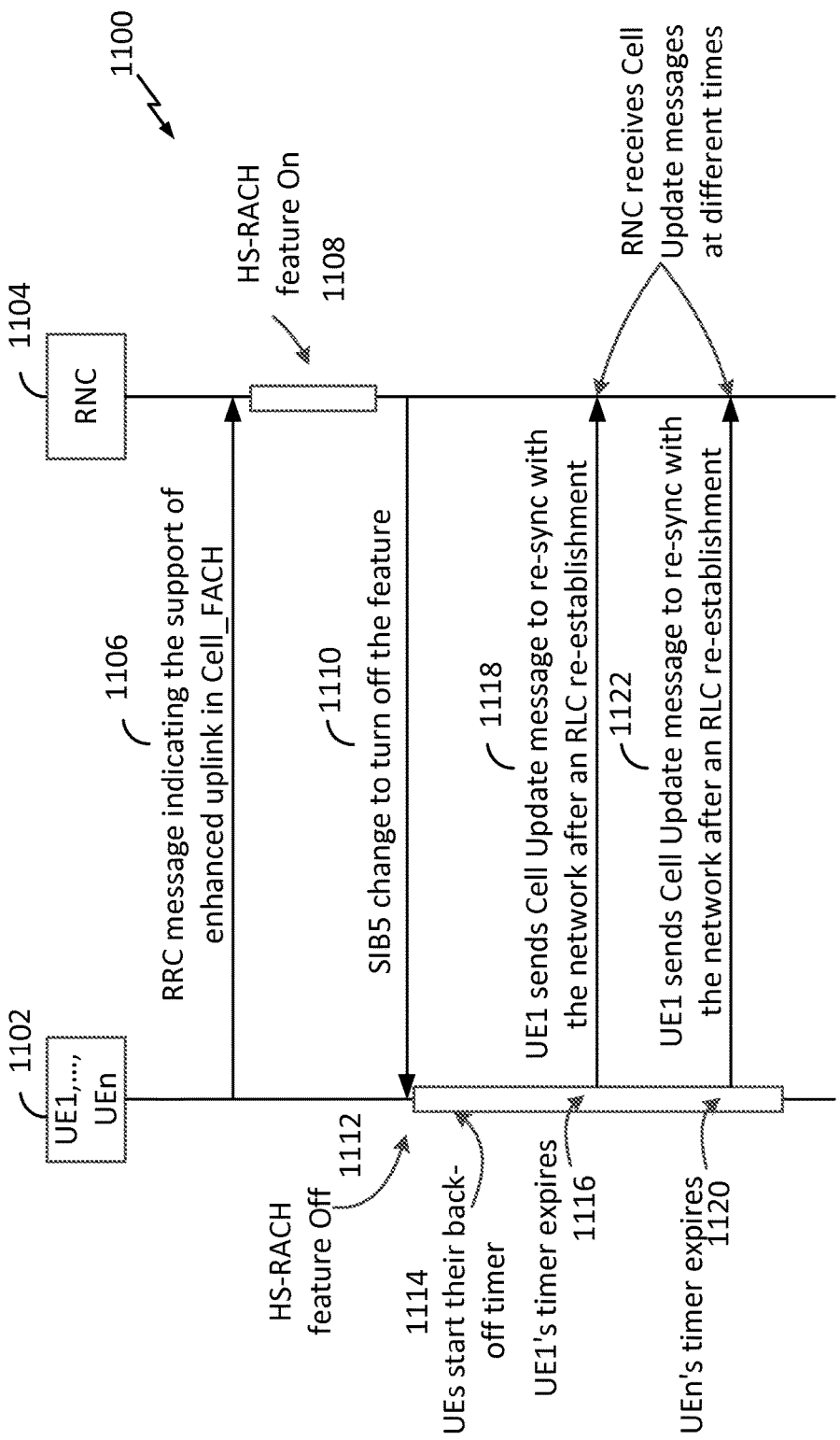
FIG. 11 is a call flow diagram illustrating a plurality of UEs utilizing a random timer to defer cell updates with a network node, according to one example.

For example, FIG. 11 is a call flow diagram 1100 illustrating an exemplary process according to some aspects of the present disclosure, wherein a plurality of UEs 1102 may utilize a randomized back-off timer to defer cell updates with a network node 1104. In a particular implementation, the UEs 1102 may be the same as the apparatus 100 (see FIG. 1), the UE 210 (see FIG. 2), or the UE 550 (see FIG. 5); and the RNC 1104 may be the same as the RNC 206 (see FIG. 2), as described above.

As described above, if the network supports the HS-RACH feature, the network can control the availability of the HS-RACH feature by broadcasting the Common E-DCH system info IE, e.g., in SIB5 or SIB5bis. By detecting the presence or absence of this IE, the UE can determine whether the network is capable of the HS-RACH feature. From the perspective of the UE, if the presence of the Common E-DCH system info IE in SIB5 or SIB5bis changes (i.e., the IE appears or disappears in the broadcasted system information block), the UE may believe that a cell change has occurred, either from a HS-RACH-capable cell to a non-HS-RACH-capable cell, or vice versa.

As shown in FIG. 11, by detecting the presence of this IE, a plurality of UEs 1102, labeled UE1-UEn may realize that the network supports HS-RACH. Once the UEs 1102 have determined that the network supports HS-RACH, each of the UEs UE1-UEn may transmit an RRC message 1106 to the RNC 1004 indicating the UE's support of HS-RACH. However, in some implementations where the HS-RACH feature is currently On, at 1108 the RNC 1104 may determine that an RLC re-establishment is desirable, e.g., to re-establish an RLC connection between the UEs 1102 and the RNC 1104. When such an RLC re-establishment is desirable, the RNC 1104 may transmit a SIB5 change 1110 to the UEs 1102 to turn Off the HS-RACH feature 1110. At 1112 the UEs 1102 may then turn Off the HS-RACH feature.

In accordance with an aspect of the present disclosure, at 1114, the UEs 1102 may each turn On a randomized back-off timer. In a further aspect of the disclosure, the time associated with the back-off timer may be a random value, such that it is unlikely that any two UEs among the plurality of UEs UE1-UEn take the same value for their respective back-off timers. Here, the back-off timers may be utilized to defer cell updates, so that the RNC 1104 does not receive a large amount of cell updates at the same time. Thus, the UEs 1102 will have different timing relative to one another, and updates can be relatively evenly distributed in time. That is, by utilizing the randomized back-off timers described herein, the RNC 1104 may receive the CELL_UPDATE messages at different times.

That is, in an aspect of the disclosure, each UE 1102 may transmit a CELL_UPDATE message, upon expiration of its respective back-off timer, to the RNC 1104 to re-sync with the network after an RLC re-establishment. According to one example, the expiration 1116 of a first back-off timer associated with a first UE (UE1) may trigger UE1 to transmit a CELL_UPDATE message 1118 to the RNC 704 to re-sync with the network after an RLC re-establishment. The expiration 1120 of a second back-off timer associated with an n$^{th}$ UE (UEn) 1120 may trigger UEn to transmit a CELL_UPDATE message 1122 to the RNC 1104 to re-sync with the network after an RLC re-establishment.

Enhanced Uplink Feature Turned Off—Different Times

Figure 12:
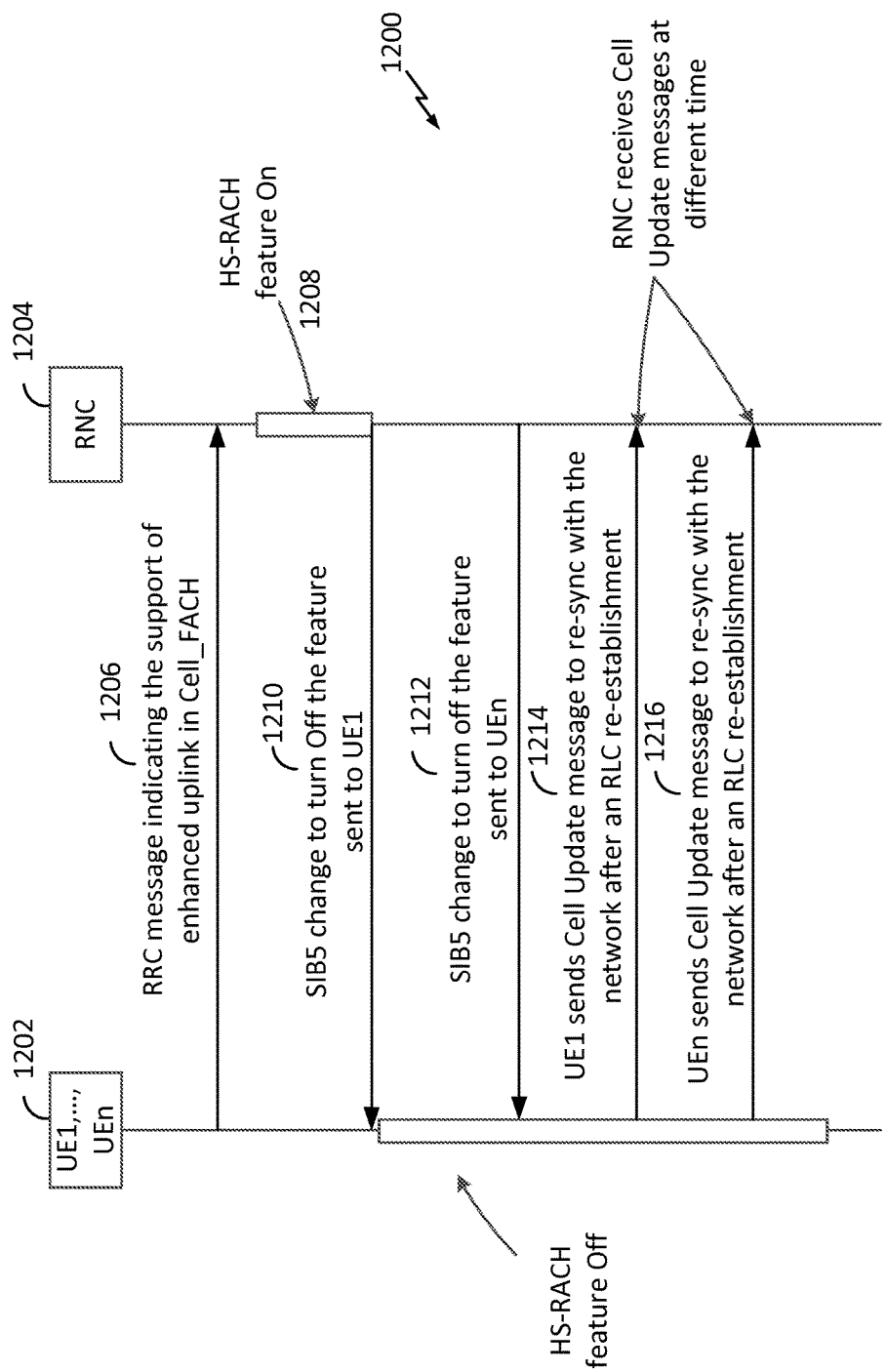
FIG. 12 is a call flow diagram illustrating a network node scheduling SIB5 or SIB5 bis updates for different sets of UEs at different times, according to one example.

FIG. 12 is a call flow diagram 1200 illustrating an exemplary process according to some aspects of the present disclosure, wherein a network node may be configured to schedule SIB5 or SIB5bis updates for different sets of UEs 1202 at different times. The cell update procedure described herein may occur between a plurality of UEs 1202 and a network node, e.g., the RNC 1204. In a particular implementation, the UEs 1202 may be the same as the apparatus 100 (see FIG. 1), the UE 210 (see FIG. 2), or the UE 550 (see FIG. 5); and the RNC 1204 may be the same as the RNC 206 (see FIG. 2), as described above.

As described above, if the network supports the HS-RACH feature, the network can control the availability of the HS-RACH feature by broadcasting the Common E-DCH system info IE, e.g., in SIB5 or SIB5bis. By detecting the presence or absence of this IE, the UE can determine whether the network is capable of the HS-RACH feature. From the perspective of the UE, if the presence of the Common E-DCH system info IE in SIB5 or SIB5bis changes (i.e., the IE appears or disappears in the broadcasted system information block), the UE may believe that a cell change has occurred, either from a HS-RACH-capable cell to a non-HS-RACH-capable cell, or vice versa.

As shown in FIG. 12, by detecting the presence of this IE, a plurality of UEs 1202, labeled UE1-UEn, may realize the network supports HS-RACH. Once the UEs realize that the network supports HS-RACH, each of the UEs UE1-UEn may transmit an RRC message 1206 to the RNC 1204 indicating the UE's support of HS-RACH. However, in some implementations where the HS-RACH feature is currently On, at 1208 the RNC 1204 may determine that an RLC re-establishment is desirable, e.g. to re-establish an RLC connection between the UEs 1202 and the RNC 1204. When such an RLC re-establishment is desirable, the RNC 1204 may transmit a SIB5 change 1210 to the UEs 1202 to turn Off the HS-RACH feature.

In accordance with an aspect of the present disclosure, at 1214, to reduce or prevent the reduction of available resources, the network may update different sets of UEs at different points of time. As such, the RNC 1204 may transmit a first SIB5 change 1210 to a first UE (e.g., UE1) or a first set of UEs to turn Off the HS-RACH. Next, the RNC 1204 may transmit a second SIB5 change 1212 to a second UE (e.g., UEn) or a second set of UEs to turn Off the e HS-RACH feature.

When the first UE (e.g., UE1) detects that there is a change in SIB5 or SIB5bis, the first UE may then transmit a CELL_UPDATE message or procedure 1214 to the RNC 1204 to re-sync with the network after the RLC re-establishment. Similarly, when the second UE reads that there is a change in SIB5 or SIB5bis, the second UE may then transmit a CELL_UPDATE message or procedure 1216 to the RNC 1204 to re-sync with the network after the RLC re-establishment.

Enhanced Uplink Feature Turned Off—RLC Layer has Data to Transmit

Figure 13:
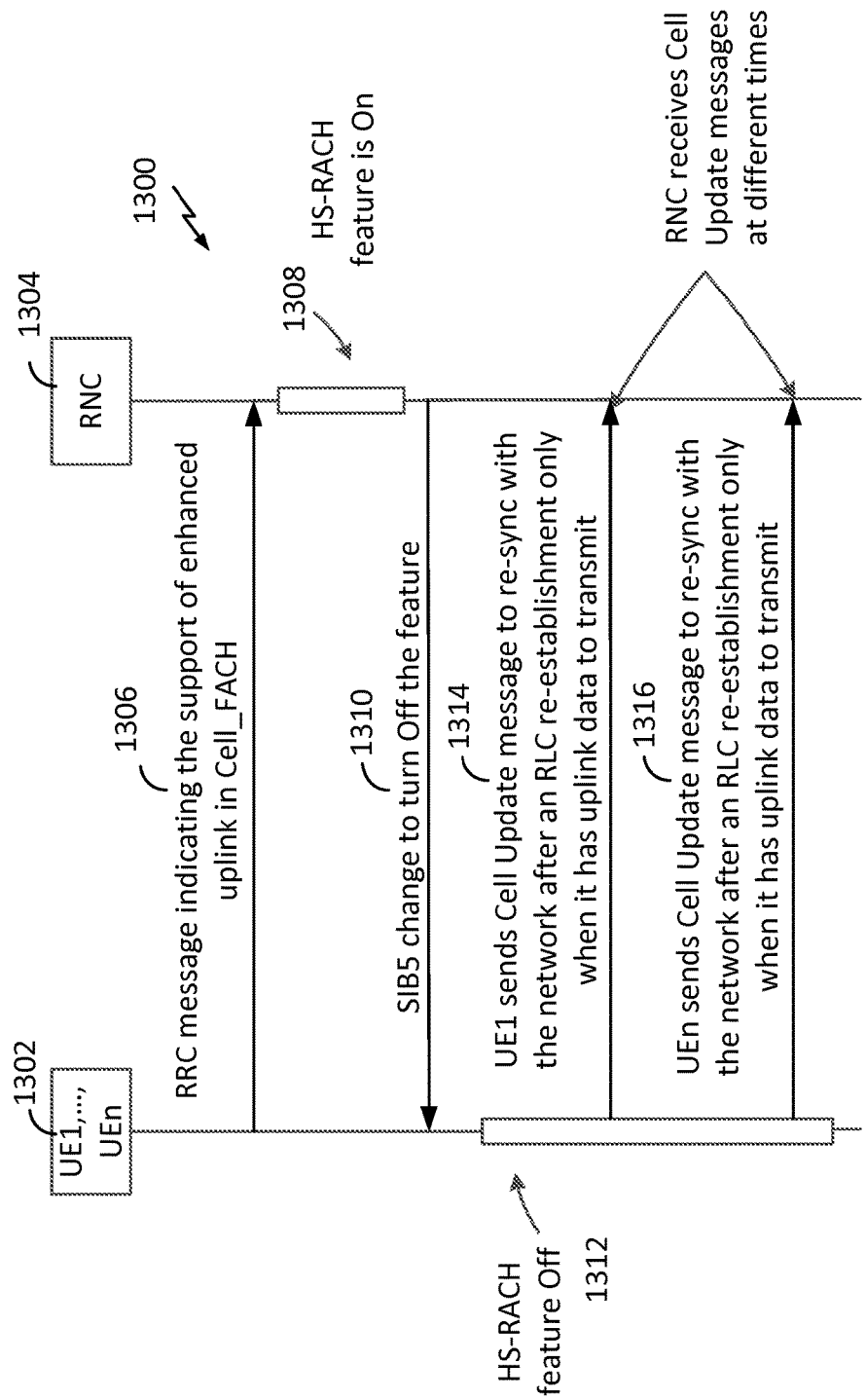
FIG. 13 is a call flow diagram illustrating a plurality of UEs, in CELL_FACH, each of which initiates a cell update message or procedure after an RLC re-establishment only when the RLC layer of the respective UE has uplink data to transmit, according to one example.

FIG. 13 is a call flow diagram illustrating an exemplary process according to some aspects of the present disclosure, wherein a plurality of UEs 1302 in a CELL_FACH state (labeled UE1-UEn) may initiate a cell update message or procedure with an RNC 1304 after an RLC re-establishment, only at such a time when the RLC layer of the respective UE has uplink data to transmit. Accordingly, when a UE detects a change in SIB5 or SIB5bis, rather than immediately initiating a CELL_UPDATE message or procedure, the UE may withhold the initiation of the CELL_UPDATE message or procedure until an upper layer (e.g., the RLC layer) has uplink data to transmit/send. As such, because the plurality of UEs may have different timing of data to transmit, updates can be more evenly distributed. Thus, when the UE has RLC data to send, it is only at that time that the UE will transmit a cell update message to the RNC 1304. In a particular implementation, the UEs 1302 may be the same as the apparatus 100 (see FIG. 1), the UE 210 (see FIG. 2), or the UE 550 (see FIG. 5); and the RNC 1304 may be the same as the RNC 206 (see FIG. 2), as described above.

As described above, if the network supports the HS-RACH feature, the network can control the availability of the HS-RACH feature by broadcasting the Common E-DCH system info IE in SIB5 or SIB5bis. By detecting the presence or absence of this IE, the UE can determine whether the network is capable of the HS-RACH feature. From the perspective of the UE, if the presence of the Common E_ECH system info IE in SIB5 or SIB5bis changes (i.e., the IE appears or disappears in the broadcasted system information block), the UE may believe that a cell change has occurred, either from a HS-RACH-capable cell to a non-HS-RACH-capable cell, or vice versa.

As shown in FIG. 13, by detecting the presence of the Common E-DCH system info IE, a plurality of UEs 1302, labeled UE1-UEn, may realize that the network supports HS-RACH. Once the UEs 1302 have determined that the network supports HS-RACH, each of the UEs UE1-UEn may transmit an RRC message 1306 indicating to the RNC 1304 the UE's support of HS-RACH. However, in some implementations where the HS-RACH feature is currently On, at 1308, the RNC 1304 may determine that an RLC re-establishment is desirable, e.g., to re-establish an RLC connection between the UEs 1302 and the RLC. When an RLC re-establishment is desirable, AT 1310 the RNC 1304 may send a SIB5 change to the UEs 1302 to turn Off the HS-RACH feature. At 1312, the HS-RACH feature may then be turned Off by the UEs.

Here, in accordance with an aspect of the present disclosure, each UE 1302 may withhold initiation of a cell update message or procedure until such a time as that particular UE has uplink data to transmit. For example, at 1314, when a first UE (e.g., UE1) has uplink data to transmit, UE1 may transmit a CELL_UPDATE message or procedure to the RNC 1004 to re-sync with the network after an RLC re-establishment.

When a second UE (e.g., UEn) reads that there is a change in SIB5 or SIB5bis, at 1316, the second UE may transmit a CELL_UPDATE message or procedure to the RNC 1304 to re-sync with the network after an RLC re-establishment. By transmitting cell update messages only when the UE has uplink data to transmit, the UEs 1302 can reduce or prevent the reduction of available resources in the network, as the RNC 1304 receives the cell update messages at different times.

Figure 14:
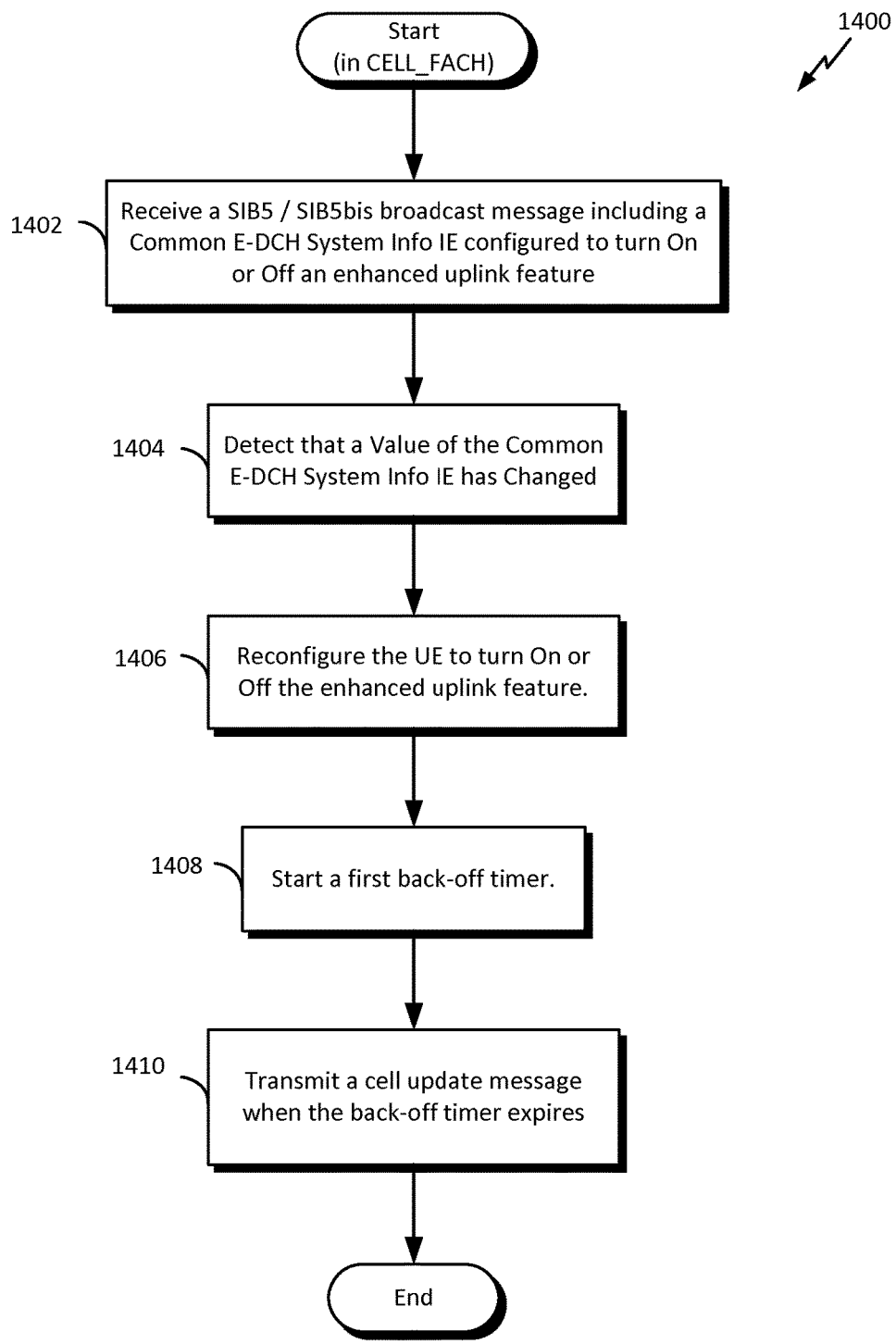
FIG. 14 is a flow chart illustrating an exemplary process for wireless communication operable on user equipment for utilizing a random timer (or back-off timer) to defer transmission of a cell update message, according to some aspects of the present disclosure.
Figure 15:
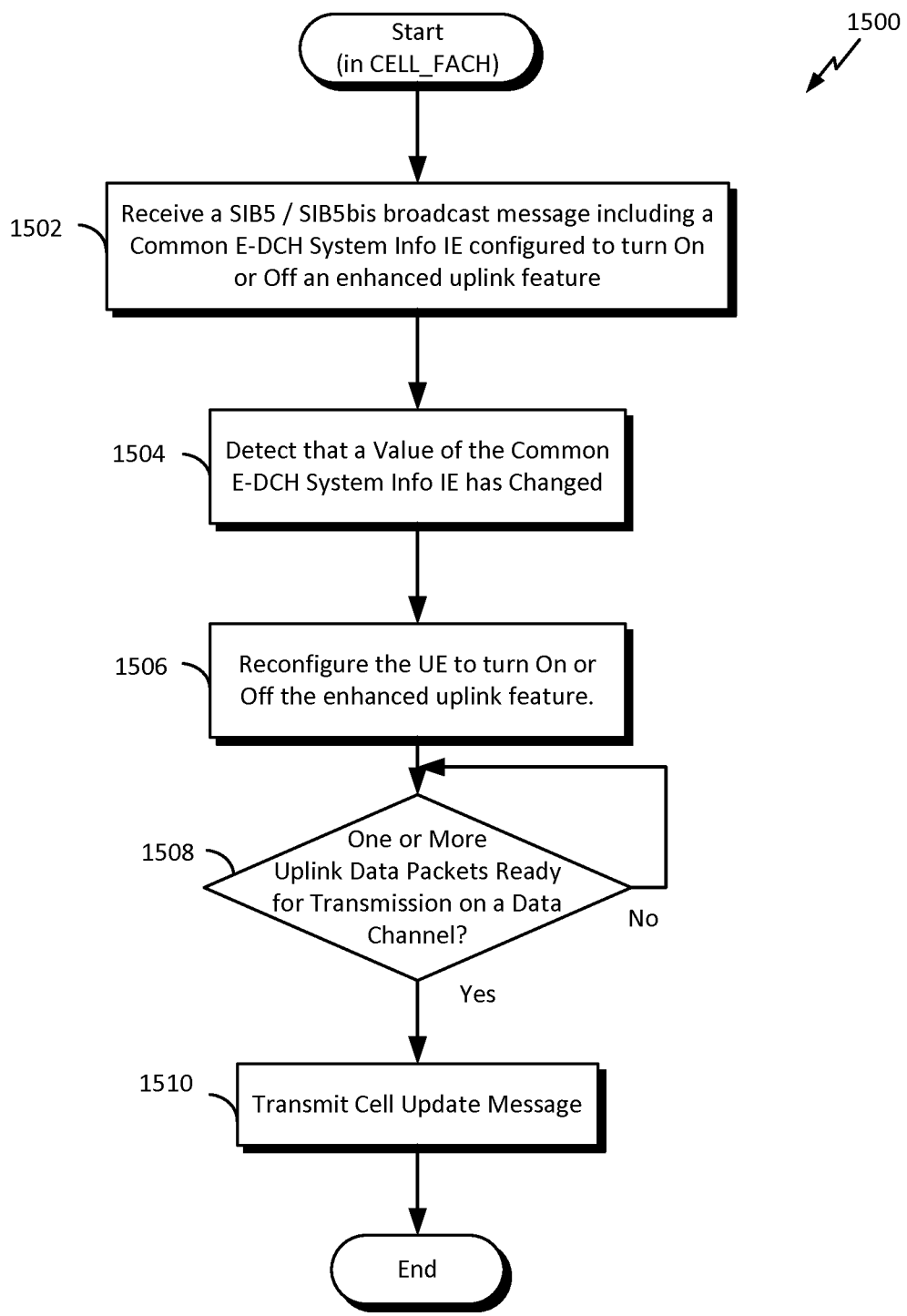
FIG. 15 is a flow chart illustrating an exemplary process for wireless communication operable on user equipment for withholding transmission of a cell update message until such a time as the UE has uplink data ready to transmit, according to some aspects of the present disclosure.

To further illustrate some of the aspects of the present disclosure, FIGS. 14 and 15 are flow charts illustrating exemplary processes for wireless communication operable on a UE for utilizing back-off timers to defer cell updates to a network node, according to some aspects of the present disclosure.

Referring now to FIG. 14, in one or more aspects of the disclosure, the process 1400 may operate while the UE is in a stand-by state, such as the CELL_FACH state, as described above. At step 1402, while operating in this stand-by state, the UE may receive a broadcast message from a network that includes an IE (e.g., the Common E-DCH system info IE) configured to turn on or off an EUL feature. That is, in an aspect of the disclosure, a HS-RACH feature may be controlled by a broadcast message, e.g., on SIB5 or SIB5bis, that includes this IE. At step 1404, the UE may detect that a value of the Common E-DCH system info IE has changed.

After receiving the broadcast message, and in response to detecting the change in SIB5 or SIB5bis, at step 1406 the UE may be reconfigured to turn On or Off the EUL feature, in accordance with the information contained in the received Common E-DCH system info IE.

Once the UE has been reconfigured, at step 1408, the UE may initiate a back-off timer. Here, the value of the back-off timer may be set according to any suitable random, or pseudo-random number generation algorithm, or may be selected according to a predetermined schedule. In this way, by withholding the transmitting of the cell update message until the expiration of the randomized back-off timer, the timing of back-off timer expiration among UEs in the cell can be spread out in time, and accordingly, a scenario where large numbers of UEs in the cell request a cell update at the same time can be reduced or avoided. That is, after the first back-off timer expires, at step 1410 the UE may transmit the cell update message to the RNC.

In this way, the RNC may receive CELL_UPDATE messages from all UEs in the cell upon the expiration of their respective back-off timers, which may be distributed in time. For example, a second UE, having a separate back-off timer different from the back-off timer of the first UE, may transmit a second CELL_UPDATE message to the RNC. The first CELL_UPDATE message may be transmitted before the second CELL_UPDATE message, however; this is by way of example only and the CELL_UPDATE messages may be transmitted as soon as a back-off timer for a UE has expired.

Referring now to FIG. 15, in one or more aspects of the disclosure, the process 1500 may operate while the UE is in a stand-by state, such as the CELL_FACH state, as described above. At step 1502, while operating in this stand-by state, the UE may receive a broadcast message from a network that includes an IE (e.g., the Common E-DCH system info IE) configured to turn on or off an EUL feature. That is, in an aspect of the disclosure, a HS-RACH feature may be controlled by a broadcast message, e.g., on SIB5 or SIB5bis, that includes this IE. At step 1504, the UE may detect that a value of the Common E-DCH system info IE has changed.

After receiving the broadcast message, and in response to detecting the change in SIB5 or SIB5bis, at step 1506 the UE may be reconfigured to turn On or Off the EUL feature, in accordance with the information contained in the received Common E-DCH system info IE.

Once the UE has been reconfigured, at step 1508, the UE may determine whether one or more uplink data packets are ready for transmission on a data channel. If not, then the UE may withhold the transmitting of the Cell Update message. However, if data is ready to transmit, then at step 1510, the UE may transmit the Cell Update message.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The invention claimed is:

1. A method of wireless communication operable on a user equipment (UE) for spreading out over time transmission from the UE of a cell update request from a transmission of a cell update request from another UE, the method comprising:
receiving, while operating in a stand-by state, a broadcast message, wherein absence of an information element (IE) configured to turn on an enhanced uplink feature indicates the enhanced uplink feature is turned off;
not keeping an identifier corresponding to the enhanced uplink feature when the enhanced uplink feature is off;
detecting that a presence of the IE configured to turn on the enhanced uplink feature has changed to turn on the enhanced uplink feature; and
transmitting a signaling message in response to the detection, wherein the transmitting the signaling message follows a withholding of the transmitting until an occurrence of a predetermined event comprising a determination that one or more uplink data packets are ready for transmission on a data channel, and wherein the signaling message comprises a request for the identifier corresponding to the enhanced uplink feature.

2. The method of claim 1, wherein the stand-by state comprises a CELL FACH state.

3. The method of claim 1, wherein the signaling message comprises a cell update message, and wherein the identifier corresponding to the enhanced uplink feature is an enhanced radio network temporary identifier (E-RNTI).

4. The method of claim 1, wherein the signaling message comprises a request to re-synchronize with a network node following a re-establishment of a radio link control (RLC) layer connection between the UE and the network node.

5. The method of claim 1, wherein the predetermined event further comprises an expiration of a back-off timer started upon receiving the broadcast message comprising the IE configured to turn on or turn off the enhanced uplink feature.

6. The method of claim 5, further comprising:
determining a random value for the back-off timer, wherein the expiration of the back-off timer occurs after a time corresponding to the random value.

7. A user equipment (UE) configured for spreading out over time transmission from the UE of a cell update request from a transmission of a cell update request from another UE, the UE comprising:
means for receiving, while operating in a stand-by state, a broadcast message, wherein absence of an information element (IE) configured to turn on an enhanced uplink feature indicates the enhanced uplink feature is turned off;
means for not keeping an identifier corresponding to the enhanced uplink feature when the enhanced uplink feature is off;
means for detecting that a presence of the IE configured to turn on the enhanced uplink feature has changed to turn on the enhanced uplink feature; and
means for transmitting a signaling message in response to the detection, wherein the transmitting the signaling message follows a withholding of the transmitting until an occurrence of a predetermined event comprising a determination that one or more uplink data packets are ready for transmission on a data channel, and wherein the signaling message comprises a request for the identifier corresponding to the enhanced uplink feature.

8. The UE of claim 7, wherein the stand-by state comprises a CELL FACH state.

9. The UE of claim 7, wherein the signaling message comprises a cell update message, and wherein the identifier corresponding to the enhanced uplink feature is an enhanced radio network temporary identifier (E-RNTI).

10. The UE of claim 7, wherein the signaling message comprises a request to re-synchronize with a network node following a re-establishment of a radio link control (RLC) layer connection between the UE and the network node.

11. The UE of claim 7, wherein the predetermined event further comprises an expiration of a back-off timer started upon receiving the broadcast message comprising the IE configured to turn on or turn off the enhanced uplink feature.

12. The UE of claim 11, further comprising:
means for determining a random value for the back-off timer, wherein the expiration of the back-off timer occurs after a time corresponding to the random value.

13. A user equipment (UE) configured for spreading out over time transmission from the UE of a cell update request from a transmission of a cell update request from another UE, the UE comprising:
at least one processor;
a memory communicatively coupled to the at least one processor; and
a wireless communication interface communicatively coupled to the at least one processor, wherein the at least one processor is configured to:
receive, while operating in a stand-by state, a broadcast message, wherein absence of an information element (IE) configured to turn on an enhanced uplink feature indicates the enhanced uplink feature is turned off;
not keep an identifier corresponding to the enhanced uplink feature when the enhanced uplink feature is off;
detect that a presence of the IE configured to turn on the enhanced uplink feature has changed to turn on the enhanced uplink feature; and
transmit a signaling message in response to the detection, wherein the transmitting the signaling message follows a withholding of the transmitting until an occurrence of a predetermined event comprising a determination that one or more uplink data packets are ready for transmission on a data channel, and wherein the signaling message comprises a request for the identifier corresponding to the enhanced uplink feature.

14. The UE of claim 13, wherein the stand-by state comprises a CELL FACH state.

15. The UE of claim 13, wherein the signaling message comprises a cell update message, and wherein the identifier corresponding to the enhanced uplink feature is an enhanced radio network temporary identifier (E-RNTI).

16. The UE of claim 13, wherein the signaling message comprises a request to re-synchronize with a network node following a re-establishment of a radio link control (RLC) layer connection between the UE and the network node.

17. The UE of claim 13, wherein the predetermined event further comprises an expiration of a back-off timer started upon receiving the broadcast message comprising the IE configured to turn on or turn off the enhanced uplink feature.

18. The UE of claim 17, wherein the at least one processor is further configured to:
determine a random value for the back-off timer, wherein the expiration of the back-off timer occurs after a time corresponding to the random value.

19. A non-transitory computer-readable medium operable on a user equipment (UE) configured for spreading out over time transmission from the UE of a cell update request from a transmission of a cell update request from another UE, the non-transitory computer-readable medium comprising:

instructions for causing a computer to receive, while operating in a stand-by state, a broadcast message, wherein absence of an information element (IE) configured to turn on an enhanced uplink feature indicates the enhanced uplink feature is turned off;
instructions for not keeping an identifier corresponding to the enhanced uplink feature when the enhanced uplink feature is off;
instructions for causing the computer to detect that a presence of the IE configured to turn on the enhanced uplink feature has changed to turn on the enhanced uplink feature; and
instructions for causing the computer to transmit a signaling message in response to the detection, wherein the transmitting the signaling message follows a withholding of the transmitting until an occurrence of a predetermined event comprising a determination that one or more uplink data packets are ready for transmission on a data channel, and wherein the signaling message comprises a request for the identifier corresponding to the enhanced uplink feature.

20. The non-transitory computer-readable medium of claim 19, wherein the stand-by state comprises a CELL FACH state.

21. The non-transitory computer-readable medium of claim 19, wherein the identifier corresponding to the enhanced uplink feature is an enhanced radio network temporary identifier (E-RNTI).

22. The non-transitory computer-readable medium of claim 19, wherein the signaling message comprises a request to re-synchronize with a network node following a re-establishment of a radio link control (RLC) layer connection between the UE and the network node.

23. The non-transitory computer-readable medium of claim 19, wherein the predetermined event further comprises an expiration of a back-off timer started upon receiving the broadcast message comprising the IE configured to turn on or turn off the enhanced uplink feature.

24. The non-transitory computer-readable medium of claim 23, further comprising:
instructions for causing the computer to determine a random value for the back-off timer, wherein the expiration of the back-off timer occurs after a time corresponding to the random value.

25. The method of claim 5, wherein:
the signaling message is associated with a cell update message or procedure; and
the method further comprises utilizing the back-off timer to defer the cell update message or procedure.

26. A method of wireless communication operable on a user equipment (UE), the method comprising:
receiving, while operating in a stand-by state, a broadcast message, wherein absence of an information element (IE) configured to turn on an enhanced uplink feature indicates the enhanced uplink feature is turned off;
not keeping an identifier corresponding to the enhanced uplink feature when the enhanced uplink feature is off;
detecting that a presence of the IE configured to turn on the enhanced uplink feature has changed to turn on the enhanced uplink feature; and
transmitting a signaling message in response to the detection, wherein the transmitting the signaling message follows a withholding of the transmitting until an occurrence of a predetermined event comprising a determination that one or more uplink data packets are ready for transmission on a data channel, and wherein the signaling message comprises a request for the identifier corresponding to the enhanced uplink feature.

27. The method of claim 26, wherein the stand-by state comprises a CELL FACH state.

28. The method of claim 26, wherein the identifier corresponding to the enhanced uplink feature is an enhanced radio network temporary identifier (E-RNTI).

29. The method of claim 26, wherein the signaling message comprises a request to re-synchronize with a network node following a re-establishment of a radio link control (RLC) layer connection between the UE and the network node.

30. The method of claim 26, wherein the predetermined event further comprises an expiration of a back-off timer started upon receiving the broadcast message comprising the IE configured to turn on or turn off the enhanced uplink feature.

31. The method of claim 30, further comprising:
determining a random value for the back-off timer, wherein the expiration of the back-off timer occurs after a time corresponding to the random value.

32. The method of claim 1, detecting that the presence of the IE configured to turn on the enhanced uplink feature has changed to turn on the enhanced uplink feature comprises:
receiving the IE in a paging type message directed to a set of UEs including the UE.

* * * * *